(12) United States Patent
Komatsu

(10) Patent No.: US 9,762,788 B2
(45) Date of Patent: Sep. 12, 2017

(54) IMAGE PICKUP APPARATUS, DEPTH INFORMATION ACQUISITION METHOD AND PROGRAM

(71) Applicant: CANON KABUSHIKI KAISHA, Tokyo (JP)

(72) Inventor: Satoru Komatsu, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/406,866

(22) PCT Filed: Jul. 23, 2013

(86) PCT No.: PCT/JP2013/070406
§ 371 (c)(1),
(2) Date: Dec. 10, 2014

(87) PCT Pub. No.: WO2014/021238
PCT Pub. Date: Feb. 6, 2014

(65) Prior Publication Data
US 2015/0109514 A1    Apr. 23, 2015

(30) Foreign Application Priority Data

Jul. 31, 2012  (JP) .................. 2012-169753
Jul. 11, 2013  (JP) .................. 2013-145333

(51) Int. Cl.
*H04N 5/222*     (2006.01)
*H04N 5/232*     (2006.01)
(Continued)

(52) U.S. Cl.
CPC .......... *H04N 5/23212* (2013.01); *G02B 7/38* (2013.01); *G06T 7/571* (2017.01); *H04N 5/2226* (2013.01);
(Continued)

(58) Field of Classification Search
CPC ............ H04N 5/23212; H04N 5/2356; H04N 5/2256; G02B 7/38; G06T 7/0069
(Continued)

(56) References Cited

U.S. PATENT DOCUMENTS 4,531,835 A * 7/1985 Oinoue .................. G03B 7/20
250/201.8
4,965,840 A   10/1990 Subbarao
(Continued)

FOREIGN PATENT DOCUMENTS

CN    102713512 A    10/2012
JP    01167610 A    7/1989
(Continued)

OTHER PUBLICATIONS

International Preliminary Report on Patentability completed Feb. 3, 2015, and mailed Feb. 12, 2015, in counterpart International Application No. PCT/JP2013/070406.
(Continued)

*Primary Examiner* — Antoinette Spinks
(74) *Attorney, Agent, or Firm* — Fitzpatrick, Cella, Harper & Scinto

(57) ABSTRACT

An image pickup apparatus includes an imaging unit that acquires a first image by capturing an object at a first focusing position, and acquires a second image after acquiring the first image, by capturing the object at a second focusing position different from the first. The second image has different blur than the first image. A depth information determination unit determines depth information of the object on the basis of a difference in blur between the first image and the second image. A focusing position setting unit sets a focus movement amount that is a difference between the first focusing position and the second focusing position, in accordance with an F-number of the imaging unit. The (Continued)

second focusing position is set such that an absolute value of the focus movement amount is larger when the F-number is large, as compared to when the F-number is relatively small.

18 Claims, 13 Drawing Sheets

(51) Int. Cl.
    *G02B 7/38*     (2006.01)
    *G06T 7/571*     (2017.01)
    *H04N 5/235*     (2006.01)

(52) U.S. Cl.
    CPC .. *G06T 2207/10028* (2013.01); *H04N 5/2356* (2013.01)

(58) Field of Classification Search
    USPC .......................................................... 348/349
    See application file for complete search history.

(56) References Cited

U.S. PATENT DOCUMENTS

| | | | |
|---|---|---|---|
| 8,698,943 B2 | 4/2014 | Isogai et al. | |
| 9,361,698 B1* | 6/2016 | Song | G06T 7/0057 |
| 9,571,719 B2* | 2/2017 | Ogura | H04N 5/23212 |
| 9,581,436 B2* | 2/2017 | Ishihara | H04N 5/23212 |
| 2012/0300114 A1 | 11/2012 | Isogai et al. | |
| 2012/0314061 A1 | 12/2012 | Yasugi | |
| 2014/0210999 A1 | 7/2014 | Komatsu | |
| 2015/0042839 A1 | 2/2015 | Komatsu et al. | |
| 2015/0109514 A1* | 4/2015 | Komatsu | G02B 7/38 |
| | | | 348/349 |

FOREIGN PATENT DOCUMENTS

| | | |
|---|---|---|
| JP | 4403477 B2 | 1/2010 |
| WO | 2012/066774 A1 | 5/2012 |
| WO | 2012/070208 A1 | 5/2012 |

OTHER PUBLICATIONS

Y.Y.Schechner, et al., "The Optimal Axial Interval in Estimating Depth from Defocus" Computer Vision, Proceedings of Seventh IEEE International Conference, 1999, vol. 2, pp. 843-848.
International Search Report issued in International Application No. PCT/JP2013/070406 dated Sep. 3, 2013.
Written Opinion issued in International Application No. PCT/JP2013/070406 dated Sep. 3, 2013.
U.S. Appl. No. 14/593,182, filed Jan. 9, 2015, Satoru Komatsu.
U.S. Appl. No. 14/617,972, filed Feb. 10, 2015, Satoru Komatsu.
Communication including extended European Search Report mailed Apr. 8, 2016, in corresponding European Patent Application No. 13825372.9-1902/2880399.
Pham, D.T, and V. Aslantas. "Depth from defocusing using a neural network," Pattern Recognition, vol. 32, 1999, pp. 715-727.
Rajagopalan, A.N., and S. Chaudhurri. "Space-Variant Approaches to Recovery of Depth from Defocused Images," Computer Vision and Image Understanding,vol. 68, No. 3, Dec. 1997, pp. 309-329.
Surya, Gopal, and Murali Subbarao. "Depth from Defocus by Changing Camera Aperture: A Spatial Domain Approach," Computer Vision and Pattern Recognition, Proceedings CVPR 1993, 1993 IEEE Computer Society Conference, New York, NY, Jun. 15-17, 1993, pp. 61-67.

* cited by examiner

FOCUS MOVEMENT AMOUNT

IMAGE PICKUP APPARATUS, DEPTH INFORMATION ACQUISITION METHOD AND PROGRAM

CLAIM OF PRIORITY

This application claims the benefit of Japanese Patent Application No. 2012-169753, filed on Jul. 31, 2012, and Japanese Patent Application No. 2013-145333, filed on Jul. 11, 2013, which are hereby incorporated by reference herein in their entirety.

TECHNICAL FIELD

The present invention relates to technology for measuring depth information of an object from a plurality of images captured by altering the focusing position.

BACKGROUND ART

Conventionally, the Depth from Defocus (DFD) method such as that described in Japanese Patent Application Publication No. H01-167610 has been proposed as a method of acquiring a depth of a captured scene from an image acquired by an image pickup apparatus. In the DFD method, a plurality of images having different amounts of blur are acquired by controlling the imaging parameters of an imaging optical system, and the respective magnitudes and correlation amounts of blur are calculated by using measurement object pixels and pixels peripheral to these in the plurality of acquired images.

Since the magnitude and correlative amount of the blur change in accordance with the depth to the object in the image, the depth is calculated by using the relationship therebetween. With depth measurement by the DFD method, it is possible to calculate the depth by one imaging system, and, therefore, such a method is advantageous in that it can be incorporated into a commercially available image pickup apparatus.

In a conventional DFD method, the fact that the magnitude of blur due to the imaging optical system changes in accordance with the depth from the object is used to estimate the depth information of the object on the basis of the magnitude of blur in a plurality of images. Since the depth can be calculated theoretically, provided that the imaging conditions of the respective images are known, then no particular mention of desirable imaging conditions is made in the '610 document or in Japanese Patent No. 4403477. As a result of ongoing research, however, the inventors discovered that the imaging conditions that are set for the plurality of images to be acquired have an effect on the depth estimate accuracy (measurement accuracy), and the measurable range, and also, that the desirable imaging conditions vary depending on the characteristics of the imaging optical system.

SUMMARY OF THE INVENTION

Therefore, it is an object of the present invention to provide technology for setting suitable imaging conditions in accordance with the characteristics of an optical system and/or the purpose of depth measurement, in an image pickup apparatus that acquires depth information about an object from a plurality of images that are captured by varying the focusing position.

The depth information about an object may be information on a relative depth (distance) from a central position between focusing positions of two images to an object, information on a relative depth (distance) from a focusing position of either one image to an object, or information on an absolute depth (distance) from the image pickup apparatus during imaging to an object. Here, the relative depth (distance) and the absolute depth (distance) may be a distance on the side of an image plane or a distance on the side of an object.

The present invention, in its first aspect, provides an image pickup apparatus, comprising an imaging unit that acquires a first image by capturing an object at a first focusing position, and that acquires a second image after acquiring the first image, by capturing the object at a second focusing position that is different from the first focusing position, the second image having different blur from the first image, a depth information determination unit determining depth information of the object on the basis of a difference in blur between the first image and the second image, and a focusing position setting unit setting a focus movement amount that is a difference between the first focusing position and the second focusing position, in accordance with an F-number of the imaging unit, wherein the focusing position setting unit sets the second focusing position in such a manner that an absolute value of the focus movement amount is larger when the F-number is large, compared to when the F-number is relatively small.

The present invention, in its second aspect, provides an image pickup apparatus, comprising an imaging unit that acquires a first image by capturing an object at a first focusing position, and that acquires a second image after acquiring the first image, by capturing the object at a second focusing position that is different from the first focusing position, the second image having different blur from the first image, a depth information determination unit determining depth information of the object on the basis of a difference in blur between the first image and the second image, and a focusing position setting unit setting the second focusing position in such a manner that a focus movement amount, which is a difference between the first focusing position and the second focusing position, satisfies the formula given below:

$$d=kF^2\lambda, \quad -16 \leq k \leq 16, \quad k \neq 0$$

where d: focus movement amount at image plane; k: coefficient; F: F-number; $\lambda$: wavelength of light used to capture first and second images.

The present invention, in its third aspect, provides a depth information acquisition method, comprising a first imaging step of acquiring a first image by capturing an object at a first focusing position, a second imaging step of acquiring a second image having different blur from the first image, by capturing the object at a second focusing position that is different from the first focusing position, after the first imaging step, and a depth information determining step of determining depth information of the object on the basis of a difference in blur between the first image and the second image, wherein the second imaging step includes a focusing position setting step of setting a focus movement amount that is a difference between the first focusing position and the second focusing position in accordance with an F-number during imaging, and in the focusing position setting step, the second focusing position is set in such a manner that an absolute value of the focus movement amount is larger when the F-number is large, as compared to when the F-number is relatively small.

The present invention, in its fourth aspect, provides a depth information acquisition method, comprising a first imaging step of acquiring a first image by capturing an object at a first focusing position, a second imaging step of acquiring a second image having different blur from the first image, by capturing the object at a second focusing position that is different from the first focusing position, after the first imaging step, and a depth information determining step of determining depth information of the object on the basis of a difference in blur between the first image and the second image, wherein the second focusing position is set in such a manner that a focus movement amount, which is a difference between the first focusing position and the second focusing position, satisfies the formula given below:

$$d = kF^2\lambda, \quad -16 \leq k \leq 16, \quad k \neq 0$$

where d: focus movement amount at image plane; k: coefficient; F: F-number; λ: wavelength of light used to capture first and second images.

The present invention, in its fifth aspect, provides a program that causes a computer to execute the respective steps of the depth information acquisition method according to the present invention.

According to the present invention, it is possible to set suitable imaging conditions in accordance with the characteristics of an optical system and/or the purpose of depth measurement, in an image pickup apparatus that acquires depth information about an object from a plurality of images that are captured by varying the focusing position.

Further features of the present invention will become apparent from the following description of exemplary embodiments with reference to the attached drawings.

DESCRIPTION OF EMBODIMENTS

The present invention relates to technology for acquiring depth information about an object on the basis of differences in the respective blur of two or more images that are captured by varying the focusing position, and thus proposes improvements in a so-called Depth from Defocus (DFD) method. The present inventors discovered that, when estimating the depth in respective pixels from a plurality of images having different focusing positions, the settings of the focusing positions in each image can affect the depth estimate accuracy and the size of the measurable depth range. Furthermore, the inventors also discovered that the desirable conditions in relation to the focusing position vary with the characteristics of the optical system of the image pickup apparatus. Therefore, the present description proposes designing the focusing position conditions of the image used for depth estimation, in accordance with the characteristics of the optical system of the image pickup apparatus. Furthermore, the present description proposes automatically changing the focusing position conditions accordingly, in the case of an image pickup apparatus having variable characteristics of the optical system (although the user may expressly change the characteristics, or the image pickup apparatus may change the characteristics automatically in accordance with the imaging mode or the environment).

The basic approach for setting the focusing position conditions in the present invention will be described below, whereupon specific conditions corresponding to the purpose of depth measurement will be described by way of example, with reference to respective embodiments.

<Setting Focusing Position Conditions>

Figure 1:
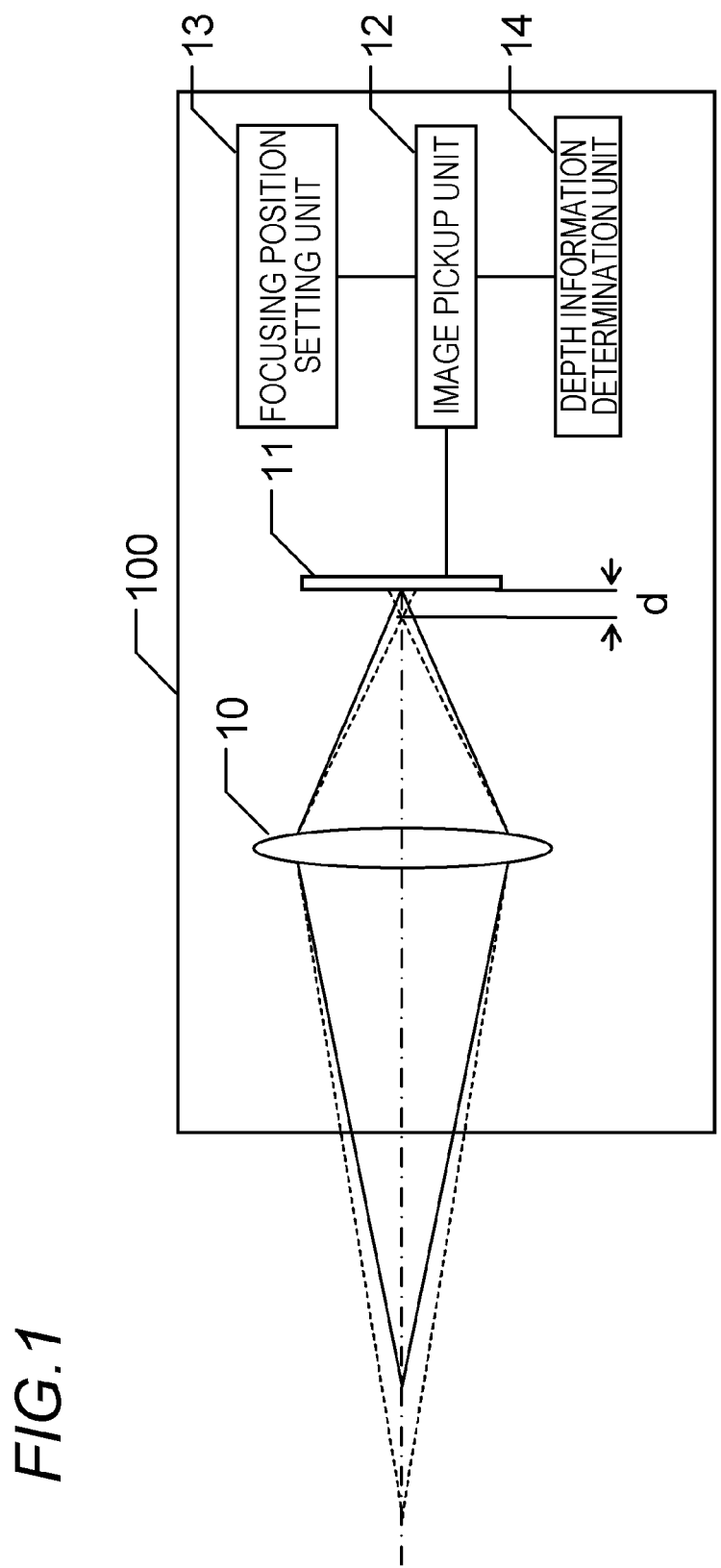
FIG. 1 is a diagram showing a composition of an imaging pickup apparatus relating to a first embodiment of the present invention.

FIG. 1 shows a schematic view of a composition of an imaging optical system and focusing positions when an image for depth estimation is captured. When estimating the depth, first, the optical system is aligned with a first focusing position (for example, the light path indicated by the solid line), and an image of the object is captured. Thereupon, the optical system is changed to a second focusing position (for example, the light path indicated by the broken line), and an image of the same object is captured. Consequently, two images having different blur are obtained.

In this case, in the present invention, the difference between the first focusing position and the second focusing position (called the "focus movement amount") is determined as indicated below from the F-number (F) of the optical system and the wavelength (λ) of the light used to capture the images. The focus movement amount in the formula given below is an amount of movement on the image plane side, and in FIG. 1, is the distance indicated by the symbol d. Furthermore, the first focusing position (image plane position) is taken to be zero.

[Math. 1]

$$d \propto F^2\lambda \quad \text{(Formula 1)}$$

Formula 1 indicates that, when the F-number of the optical system is large, the absolute value of the focus movement amount d should be made larger than when the F-number is relatively small.

Moreover, desirably, the focus movement amount d is set so as to satisfy Formula 2 described below, using the proportionality coefficient k.

[Math. 2]

$$d=kF^2\lambda, \quad -16 \leq k \leq 16, \quad k \neq 0 \qquad \text{(Formula 2)}$$

<Meaning of Condition Formula>

The basic principle of the DFD method is to estimate the depth information about the object (the depth information in each pixel) by extracting the change in blur from a plurality of images having different imaging conditions. In the descriptions below, the depth information about the object means the relative depth (distance) from the focusing position on the side of the image plane. The degree of change in blur between the images is dependent on the characteristics of the imaging optical system, that is, the depth of field of the imaging optical system. In other words, if the depth of field is shallow, a sufficient change in blur is obtained even if the focus movement amount is small, but if the depth of field is deep, then a sufficient change in blur is not obtained, unless the focus movement amount is made large. Since the depth of field is directly proportional to $F^2\lambda$, then a desired change in blur is obtained by specifying the focus movement amount d, as shown in Formula 1 and Formula 2.

Next, a relationship between the value of the coefficient k and the depth measurement in Formula 2 will be described. This coefficient k can be used as a parameter for adjusting the depth measurement accuracy (resolution) and the measurable depth range (also, simply called "depth measurement range"). The present inventors discovered by simulation and experimentation that a desirable range of the coefficient k is as indicated below.

As shown in Formula 2, the coefficient k should be a value in the range $-16 \leq k \leq 16$ ($k \neq 0$). This is because, if k is less than $-16$ or is greater than $+16$, then the blur of the object becomes greater, and the measurement accuracy declines. A case of $k=0$ is excluded because a difference in blur is not obtained between images having the same focusing position. The range of the coefficient k indicated in Formula 2 is especially effective in cases when an indicator other than the broadening (magnitude) of blur (for example, an indicator such as the peak change of a PSF or the correlation of a PSF, etc.) is used as a depth measurement indicator. This is because, in the case of a method that evaluates broadening of the blur, when the focus movement amount d specified in Formula 2 is used, the blur is too small and, hence, there is a risk that this will lead to a decline in measurement accuracy.

If the purpose of the depth measurement is a two-layer depth separation, in other words, to judge whether or not an object is included in a particular depth range, then the coefficient k should be set to a value in the range of $-16 \leq k \leq -8$, $8 < k \leq 16$. Since the depth measurement range becomes smaller, the closer the absolute value of the coefficient k to the upper limit value of 16 indicated in Formula 2, then this range is suitable for judging whether or not an object under observation is situated within a particular depth range.

On the other hand, if the purpose of the depth measurement is to judge the depth separation of multiple layers, in other words, to judge in which of three or more depth ranges an object is included, then the coefficient k should be set to a range of $-8 \leq k \leq 0$, $0 < k \leq 8$. This is because, since the depth measurement range becomes greater, the smaller the absolute value of the coefficient k, then this range is suitable for separation in two or more layers. However, with the range $-1 \leq k < 0$, $0 < k \leq 1$, although the depth measurement range is large, the depth resolution declines and, therefore, it is more desirable to adopt a range of $-8 \leq k < -1$, $1 < k \leq 8$.

Moreover, it is suitable if the coefficient k has a value in the range of $-4 < k \leq -2$, and $2 \leq k < 4$. In this range, the balance between the size of the depth measurement range and the depth resolution is especially good, and it is possible to measure a broad depth range with high accuracy.

First Embodiment

FIG. 1 shows a schematic view of a principal composition of an image pickup apparatus relating to a first embodiment of the present invention.

The image pickup apparatus 100 includes an imaging optical system 10, an image sensor 11, an image pickup unit 12, a focusing position setting unit 13, and a depth information determination unit 14. The imaging optical system 10 used in the present embodiment may be a fixed-focus optical system or a variable-focus optical system, and may be constituted by an imaging optical system of a normal image pickup apparatus that captures images. The image sensor 11, which is arranged on the image plane, may be an image sensor having a color filter, a monochrome image sensor, or a three-plate type image sensor.

The image pickup apparatus according to the present embodiment captures a first image, which is captured by focusing at a desired object depth indicated by the solid line in FIG. 1, and a second image in which the focusing position is shifted, as indicated by the dotted line in FIG. 1. The focus movement amount in this case is the symbol d shown in FIG. 1, and is the difference in the optical axis direction between the focusing positions at the image plane.

The operation of the image pickup apparatus 100 is now described. When imaging starts, the image pickup unit 12 captures a first image by driving the imaging optical system 10 to focus on the object. Thereupon, the image pickup unit 12 drives the imaging optical system 10 so as to move the image plane through a focus movement amount d set by the focusing position setting unit 13, and captures a second image.

The focusing position setting unit 13 sets the amount of movement d of the image plane from the first focusing position, in accordance with the F-number during imaging, by using Formula 2. The coefficient k in Formula 2 is a previously given value. Here, it is assumed that the image pickup apparatus has a variable F-number, but in the case of an image pickup apparatus having a fixed F-number, a focus movement amount d set previously by Formula 2 is saved in a memory of the image pickup apparatus.

The first image and the second image, which are captured by the image pickup unit 12, are output to the depth information determination unit 14. The depth information determination unit 14 calculates depth information about the object, on the basis of difference between the blur of the two input images.

Table 1 shows imaging conditions according to the present embodiment.

TABLE 1

| Imaging conditions | |
|---|---|
| Focal length of imaging optical system | 18.0 (mm) |
| F-number | 4.00 |
| Object distance | 3000 (mm) |
| Focus movement amount at image plane | −0.0200 (mm) |
| Depth measurement wavelength | 587.56e−6 (mm) |

In the case of the imaging conditions in Table 1, the range of the maximum focus movement amount d obtained from Formula 2 is:

−0.150 mm<d<0.150 mm, d≠0.

Consequently, the focus movement amount shown in Table 1 satisfies Formula 2. In the imaging conditions in Table 1, the coefficient k is set to 2.13.

Next, the criteria for setting the focus movement amount under the imaging conditions according to the present embodiment will be described.

Figure 2:
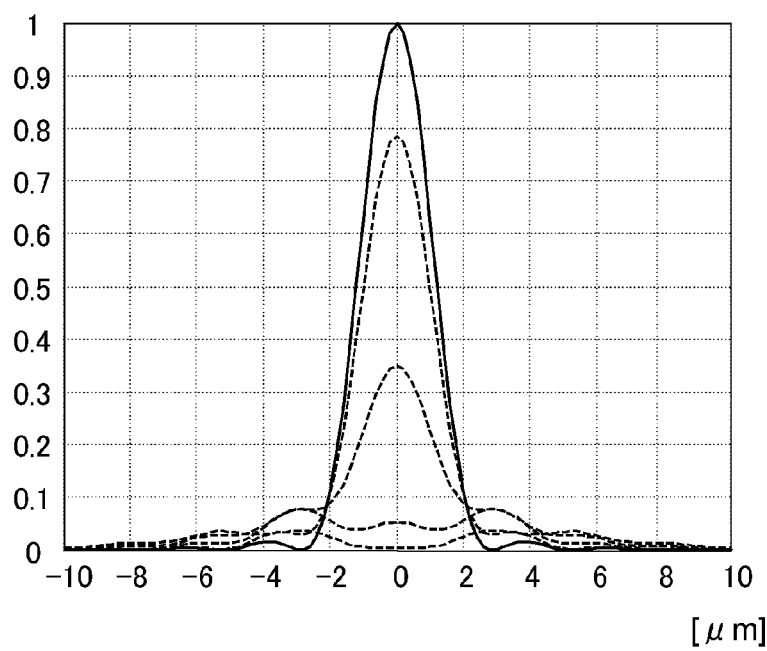
FIG. 2 is a diagram plotting a cross section of a Point Spread Function (PSF)

The focus movement amount is set to a value that is suited to cases when depth is measured by using the defocusing characteristics of the peak value of a PSF (Point Spread Function) (the PSF-number at the central coordinates of the PSF). The present embodiment is described here with reference to the PSF of an ideal imaging optical system, which has no aberration, but it is also possible to adopt the same approach for an actual imaging optical system. The ideal shape of a PSF that does not have any aberration at the focusing position is a shape such as a Gaussian function in which the value at the central coordinates of the PSF is a peak and the value decreases smoothly from this peak. In FIG. 2, the cross-sectional shape of the PSF is depicted by a solid line. However, as defocusing occurs, the value at the central coordinate of the PSF decreases, and the shape deforms. The dotted lines in FIG. 2 show the cross section of the PSF when the image is defocused by 20 μm, 40 μm, 60 μm, 80 μm, respectively.

By detecting the relative change between two images in the value of the central coordinate of the PSF, it is possible to calculate the amount of defocus and hence, the depth can be measured. In the present description, the value of the central coordinate of the PSF is defined as the "peak value of the PSF".

Figure 3:
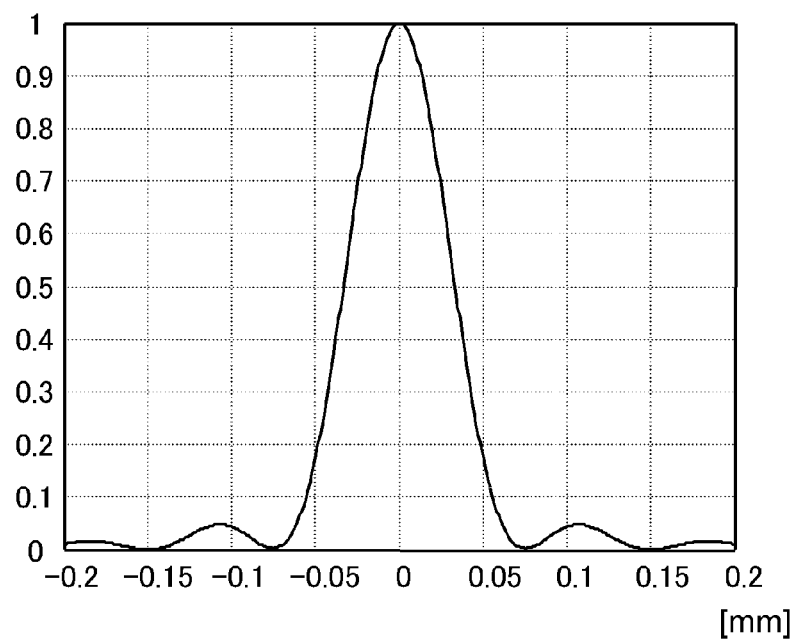
FIG. 3 is a diagram showing defocusing characteristics of a PSF peak value.

Next, the relationship between the defocusing characteristics of the PSF peak value and the depth measurement will be described. The defocusing characteristics of the PSF peak value described above are described here with reference to FIG. 3. FIG. 3 is a diagram showing a change due to defocusing in the PSF peak value at the image plane under the imaging conditions according to the present embodiment shown in Table 1, in an ideal case when there is no aberration in the imaging optical system.

As shown in FIG. 3, the peak value of the PSF becomes a maximum at the focusing position, and declines as the image becomes defocused, progressively approaching zero while oscillating in the manner of a SINC function. In this case, as the image becomes defocused until reaching the vicinity of local minimum values that appear initially both before and after the focusing position, there are cases when the value in the peripheral regions is larger than in the center of the PSF coordinates, as indicated by the dotted lines that are defocused by 60 μm or 80 μm in FIG. 2. The peak value in the case of a large amount of defocusing of this kind is much smaller than the peak at the focusing position, and the uncertainty is increased due to detecting the effects of noise, and the like.

<PSF Peak Ratio>

Next, a method of calculating a depth from the peak value of the PSF will be described.

The depth can be calculated, provided that the defocusing change of the PSF peak value can be determined from the captured image. However, due to the effects of the object, it is difficult to determine, from only one image, the peak value of the PSF of the imaging optical system. Therefore, a plurality of images are used, each captured by varying the imaging conditions in order to eliminate the effects of the object. A ratio should be taken in order to cancel out the effects of the object. More specifically, it is possible to carry out a depth measurement by matching the value of the PSF peak ratio obtained from two images that are actually captured to the defocusing characteristics of the PSF peak ratio of the imaging optical system, which is determined theoretically.

Figure 4:
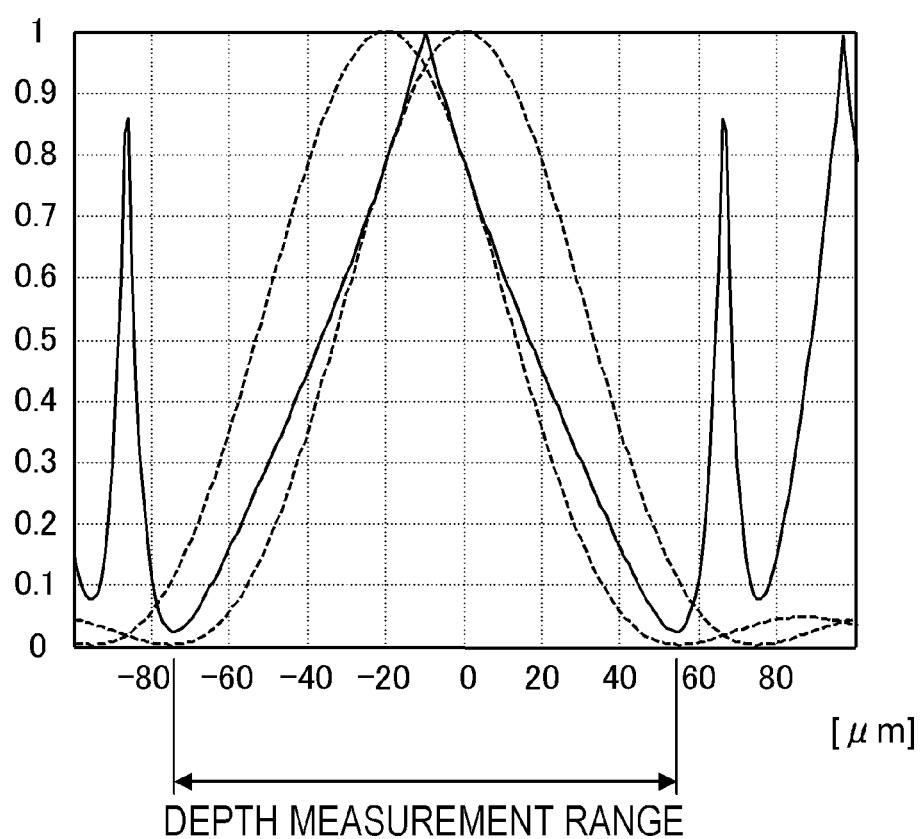
FIG. 4 is a diagram showing the characteristics of a PSF peak ratio relating to the first embodiment of the invention.
Figure 5A:
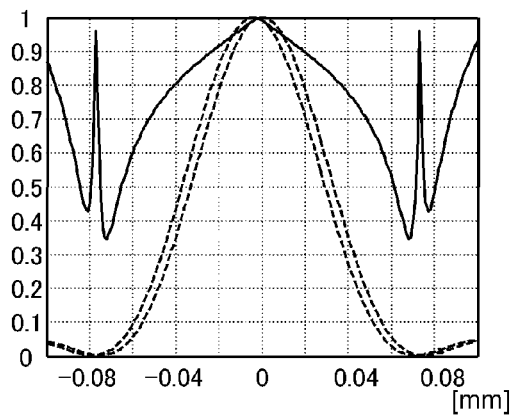
FIGS. 5A to 5F are diagrams showing a change in the PSF peak ratio with a change in the focus movement amount.
Figure 5B:
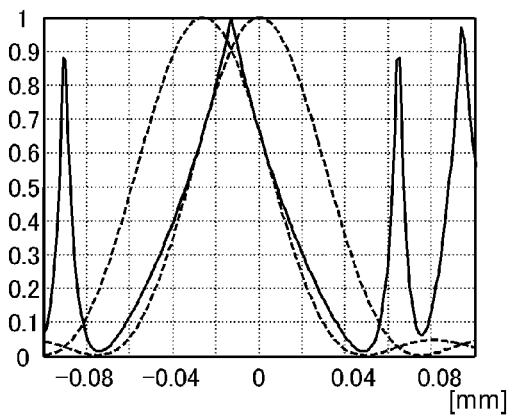
Figure 5C:
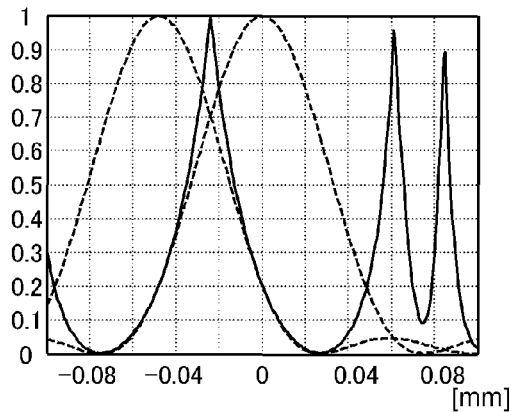
Figure 5D:
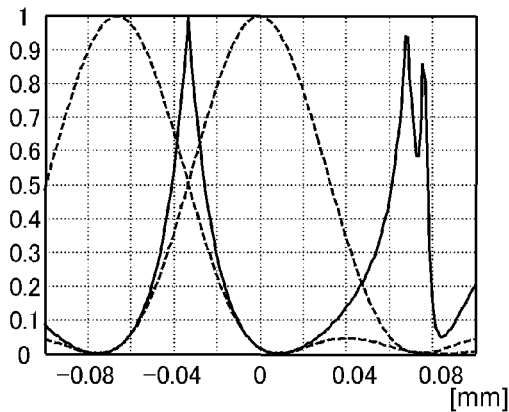
Figure 5E:
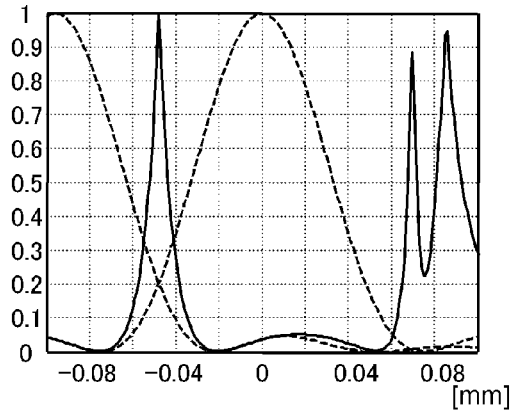
Figure 5F:
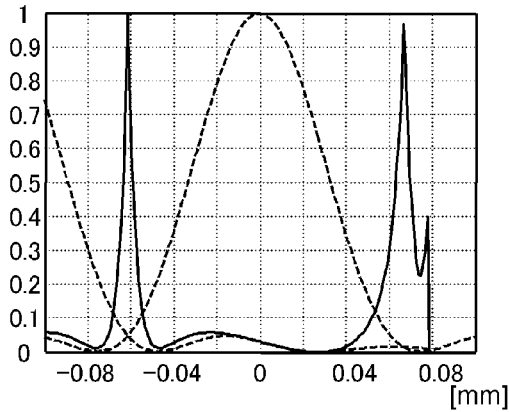

FIG. 4 shows the defocusing characteristics of the PSF peak values of two images and the defocusing characteristics of the PSF peak ratio, as determined theoretically from the imaging conditions shown in Table 1. The lateral axis indicates the focusing position at the image plane. The curve indicated by the solid line in FIG. 4 shows the defocussing characteristics of the ratio between the peak values of two PSFs for different focusing positions. The two curves indicated by the dotted lines are the defocusing characteristics of the peak values of two PSFs for different focusing positions. The case shown here relates to the PSF in an ideal imaging optical system that is free of aberration and has a focusing position at infinity.

When finding the peak ratio, the values are normalized using the largest peak value as a denominator. Consequently, the PSF peak ratio traces a symmetrical curve that has a maximum value of one, has a peak in a central position between the two focusing positions, and progressively declines away from the peak.

From the foregoing, it is possible to determine the relative depth from the central position between the focusing positions of two images, by calculating the PSF peak ratio. In this case, it is possible to distinguish between the values before and after the peak, depending on which of the PSF peak values is used for normalizing the values.

Furthermore, in order to determine the depth Zo on the object side from the PSF peak ratio, the amount of defocus Zi from the focusing position at the image plane is determined from the value of the PSF peak ratio. Next, the focal length f and the object distance (depth) s are used to determine

[Math. 3]

$$s' = \frac{fs}{f+s} \qquad \text{(Formula 3)}$$

the depth s' on the image plane side, and the amount of defocus Zi is used as follows

Figure 15:
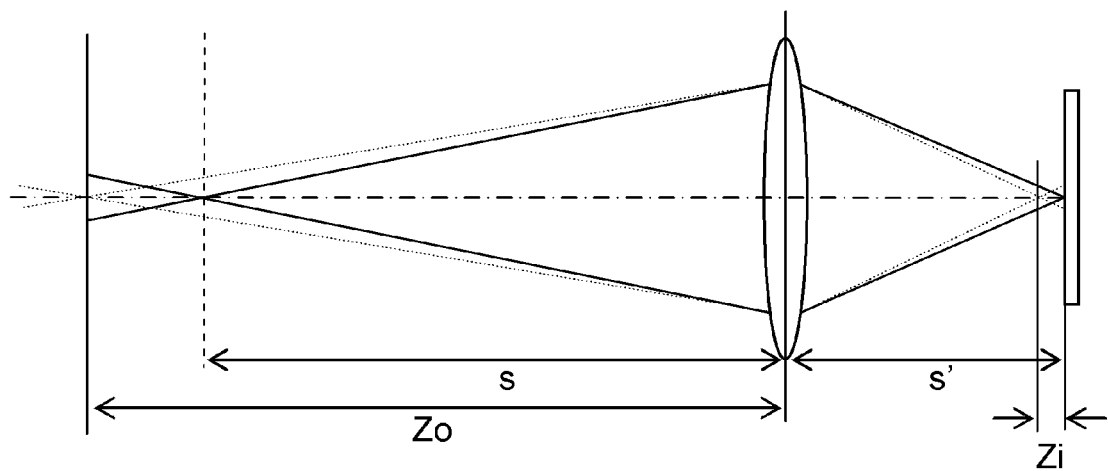
FIG. 15 is a diagram showing a relationship between object depth and image plane depth.

[Math. 4]

$$Z_o = \frac{f(s'+Z_i)}{f+(s'+Z_i)} \qquad \text{(Formula 4)}$$

to convert to the distance (depth) on the object side. The corresponding results are shown in FIG. 15.

<Method for Calculating PSF Peak Ratio from Images>

The method of calculating the PSF peak ratio from two images that have actually been captured will now be described. The corresponding local regions I1 and I2 in the two images are represented by the convolution of the scene s and the PSF1 and the convolution of the scene s and the PSF2, respectively. If these regions, after a Fourier transform, are called FI1 and FI2, and the Fourier transform of the scene s is called S, then the ratio therebetween is given by:

[Math. 5]

$$\frac{FI2}{FI1} = \frac{\mathcal{F}\{PSF2 \otimes s\}}{\mathcal{F}\{PSF1 \otimes s\}} = \frac{OTF2 \cdot S}{OTF1 \cdot S} = \frac{OTF2}{OTF1} = OTFr.$$ (Formula 5)

Here, the optical transfer function obtained by a Fourier transform of the PSF is called the OTF, and the ratio between the two OTFs is called OTFr. This OTFr value is a value that is independent of the scene, because the scene S is cancelled out, as shown in Formula 5.

If the peak ratio PSFr of the PSF is determined from the OFTr, then the average value of the OTFr should be determined as indicated in the expression below. If the peak of the PSF is situated in the center of the images I1, I2, then the PSF peak ratio, PSFr, is given by:

[Math. 6]

$$PSFr(0, 0) = \mathcal{F}^{-1}\{OTFr(u, v)\}(x = 0, y = 0)$$ (Formula 6)
$$= \frac{1}{\int\int du dv} \int\int OTFr(u, v) du dv.$$

If this is expressed discretely, then the following expression:

[Math. 7]

$$PSFr(0, 0) = \frac{1}{N_u N_v} \sum_{i=1}^{N_u} \sum_{j=1}^{N_v} OTFr(u_i, v_j)$$ (Formula 7)

is obtained.

It is possible to obtain the amount of defocus of the object in the images I1 and I2, in other words, the depth information, by matching the PSF peak ratio, PSFr, which is calculated from the images by Formula 7, to the defocusing characteristics of the PSF peak ratio such as that shown in FIG. 4.

<Depth Measurement Range>

Next, the depth measurement range in the depth measurement using the PSF peak ratio will be described with reference to FIG. 4.

As indicated by the solid line in FIG. 4, the value of the defocusing characteristics of the PSF peak ratio falls gradually from the central position between the two different focusing positions, reaches a local minimum value, and then rises again, subsequently repeating this pattern. This is because, as shown in FIG. 3, the defocusing characteristics of the PSF peak value oscillate. Below, the maximum peak in the defocusing characteristics curve of the PSF peak value and the PSF peak ratio is called the "maximum peak" or the "primary peak", and the local minimum values, which respectively appear first on the front side and the rear side of the maximum peak, are called the "primary minimum values".

The PSF peak values from the primary minimum value onwards have a low value and are readily affected by noise, and the like, as can be seen by observing the defocusing characteristics of the PSF peak values in FIG. 3. Therefore, when the ratio is found, the variation increases and the reliability is low. Therefore, the depth measurement range, which is reliable, should be set from the position of the primary minimum value on the front side of the maximum peak to the position of the primary minimum value on the rear side, in the defocusing characteristics of the PSF peak ratio (the solid line in FIG. 4). In the example in FIG. 4, this range is from −75 μm to 55 μm. The negative side in FIG. 3 is the front side.

Here, the position of the primary minimum value of the PSF peak ratio that defines the depth measurement range is dependent on the position of the primary minimum value of the defocusing characteristics of the PSF peak value (the dotted line in FIG. 4). As shown in FIG. 4, the position of the primary minimum value of the PSF peak ratio on the front side corresponds to the position of the primary minimum value on the front side of the PSF peak value of the image that has a focusing position to the rear side, of the two images having different focusing positions. On the other hand, the position of the primary minimum value of the PSF peak ratio on the rear side corresponds to the position of the primary minimum value on the rear side of the PSF peak value of the image having a focusing position to the front side.

Therefore, in a depth measurement that uses the PSF peak ratio as an indicator, the depth measurement range can be determined by the position of the primary minimum values of the defocusing characteristics of the PSF peak value. In other words, this indicates that the depth measurement range can be set in accordance with the focus movement amount.

<Focus Movement Amount and PSF Peak Ratio Characteristics>

Next, the relationship between the focus movement amount and the change in the depth measurement range, and the relationship between the focus movement amount and the change in the value range of the PSF peak ratio, will be described, and the setting of a more suitable focus movement amount will be explained.

FIGS. 5A to 5F show the defocusing characteristics of the PSF peak value and the change in the PSF peak ratio, when the focus movement amount is changed. The focus movement amount is expressed as a difference in the horizontal axis direction between the defocussing characteristics of two PSF peak values (dotted line). In other words, the focus movement amount gradually becomes larger, from FIG. 5A toward FIG. 5F. Here, examples are shown in which the value at the point of intersection of the defocussing characteristics of the two PSF peak values (the point of intersection of the dotted lines) is set respectively to 99.8%, 90%, 70%, 50%, 20% and 5% of the maximum value of the PSF peak value. It can be seen that, as the focus movement amount increases, the characteristics of the PSF peak ratio (solid line) change. More specifically, it can be seen that the depth measurement range (the range between the primary minimum value position on the front side and the primary minimum value position on the rear side of the PSF peak ratio) becomes gradually narrower as the focus movement amount becomes larger.

Similarly, it can be seen that the value range of the PSF peak ratio (the difference between the maximum value and the primary minimum value of the PSF peak ratio) broadens sharply as the focus movement amount becomes larger and, thereafter, gradually approaches one. The depth resolution becomes higher, the broader the value range of the PSF peak ratio, and hence, the tolerance with respect to variable factors, such as noise, becomes higher, and the depth measurement accuracy is improved.

Figure 6A:
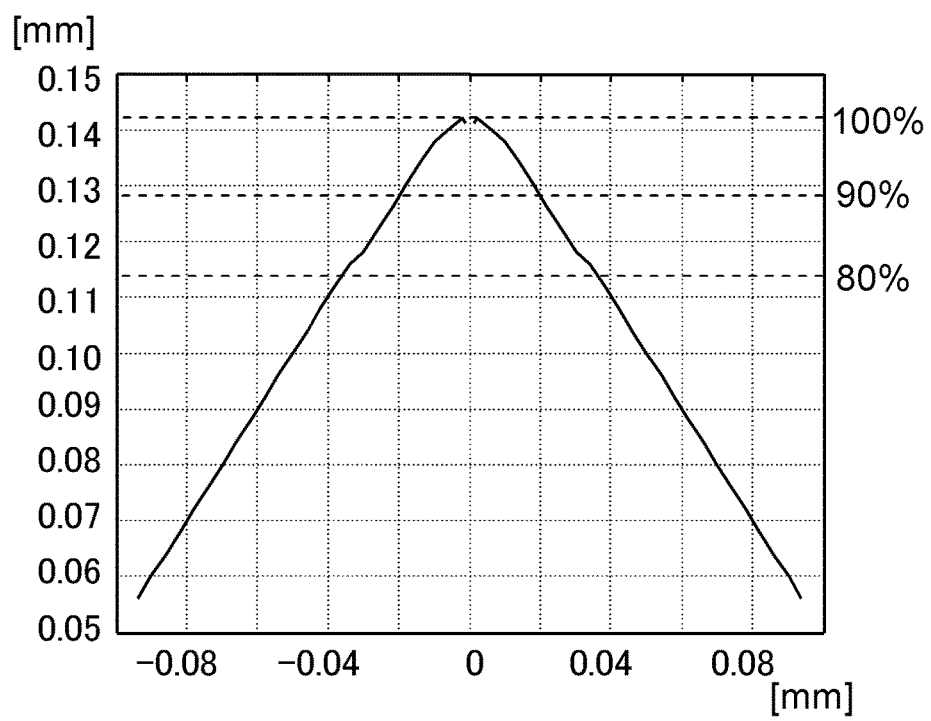
FIGS. 6A and 6B are diagrams showing the dependence on the focus movement amount, of the depth measurement range and the value range of the PSF peak ratio.
Figure 6B:
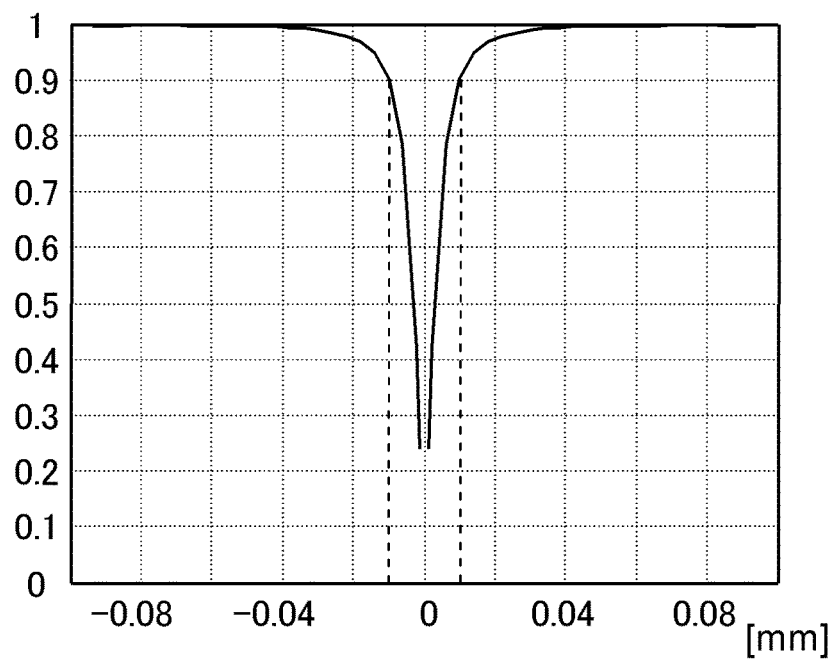

FIGS. 6A and 6B respectively show a change in the depth measurement range in accordance with the focus movement amount, and a change in the range of the value of the PSF peak ratio. In FIG. 6A, the horizontal axis represents the focus movement amount and the vertical axis represents the depth measurement range on the side of the image plane. Similarly, in FIG. 6B, the horizontal axis represents the focus movement amount and the vertical axis represents the value range. Here, the PSF peak ratio is normalized and, therefore, the maximum value of the value range is one. There is a singular point when the focus movement amount is zero, since depth measurement is not possible in this case.

<Policy with Regard to Optimal Focus Movement Amount>

In the present embodiment, the focusing position conditions are set in such a manner that both a wide depth measurement range and a high depth resolution (broad value range) can be achieved simultaneously. More specifically, the focus movement amount should be set in such a manner that the depth measurement range is no less than 80% of the maximum range and in such a manner that the value range is no less than approximately 90% of the maximum value range.

The value range is set to no less than approximately 90% of the maximum value range in order to improve the SN ratio of the PSF peak ratio. Taking account of the fact that the signal containing several percent of noise, an error of approximately two times the noise is generated in respect of the PSF peak ratio. Therefore, even with objects that are situated at the same depth, due to the effects of noise, the value of the PSF peak ratio is different. Here, if the value of the PSF peak ratio of objects situated at the same depth is brought within a width σ, then the reliable number of depth divisions is a number obtained by dividing the value range of the PSF peak ratio by the width σ. Consequently, the reliable depth resolution increases as the value range of the PSF peak ratio becomes greater, and, therefore, it is suitable to set the value range to be no less than approximately 90% of the maximum value range.

In the PSF peak ratio, the value range becomes larger, the larger the focus movement amount, as shown in FIG. 6B. However, the depth measurement range decreases as the focus movement amount becomes larger (FIG. 6A). In order to maintain a broad depth measurement range, it is necessary to apply a limit to the focus movement amount, and a range of no less than 80% of the maximum range is satisfactory, and a range of approximately 90% thereof is more desirable.

In order to set the value range to no less than 90% under the imaging conditions of the present embodiment, the absolute value of the focus movement amount should be set to no less than roughly 0.01 mm (see FIG. 6B). Furthermore, in order to achieve a depth measurement range of no less than 114 μm, which is 80% of a maximum depth measurement range of 142 μm, the absolute value of the focus movement amount should be no more than roughly 0.036 mm (see FIG. 6A). In other words, in order to satisfy the conditions described above, the focus movement amount should be set to a range of −0.036 mm to −0.01 mm or 0.01 mm to 0.036 mm.

In the present embodiment, the focus movement amount is set to −0.020 mm, the value range is set to no less than approximately 90% of the maximum value range, and the depth measurement range is set to 90% of the maximum range. The imaging conditions of the present embodiment that satisfy these conditions have an advantageous effect in that, since the focus movement amount is small, the imaging interval can be shortened. Furthermore, since the focus movement amount is small, the maximum value of the PSF peak ratio is close to the focusing position of the first image and, hence, there is an advantageous effect in that depth measurement before and after the focusing position becomes possible.

<F-Number Dependence>

In the imaging conditions according to the present embodiment, the focus movement amount is d=−0.020 mm, the F-number is F=4, the wavelength is λ=587.56 nm, and the coefficient is k=2.13. This value of the coefficient k satisfies 2≤k<4, which is a condition that achieves a good balance between the breadth of the depth measurement range and the depth resolution that was described above.

Figure 7:
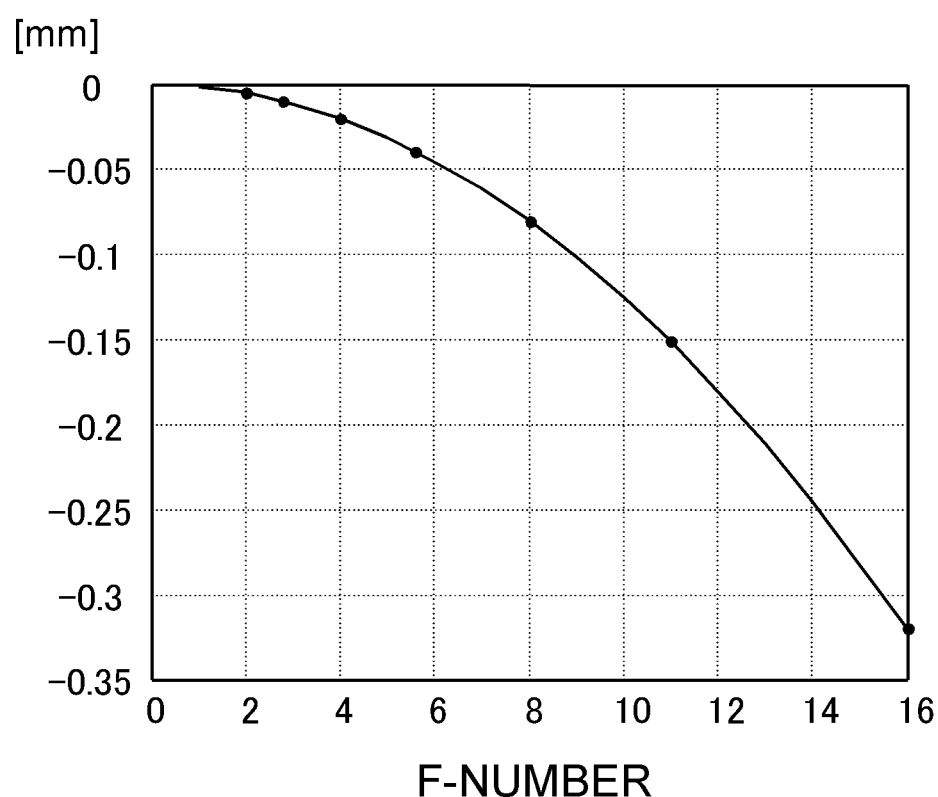
FIG. 7 is a diagram showing the relationship between the focus movement amount and the F-number.

In the image pickup apparatus according to the present embodiment, the values shown in Table 2 are obtained when Formula 2 is used to determine the optimal focus movement amount d when the F-number is changed during imaging. FIG. 7 is a graph that plots the F-number on the horizontal axis and plots the focus movement amount on the vertical axis.

TABLE 2

| F-number | Focus movement amount (mm) |
|---|---|
| 2 | −0.005 |
| 2.8 | −0.010 |
| 4 | −0.020 |
| 5.6 | −0.039 |
| 8 | −0.080 |
| 11 | −0.151 |
| 16 | −0.320 |

If the F-number is changed automatically or by a user operation during imaging, then the focusing position setting unit 13 calculates the focus movement amount d by Formula 2 using the changed F-number and a predetermined value of the coefficient k, and sets a first focusing position and a second focusing position on the basis of this focus movement amount d. In this case, the focusing position setting unit 13 may carry out the calculation in Formula 2, but it is also possible to previously store a correspondence table of the F-number and the focus movement amount such as that shown in Table 2, in the memory, and to read out a focus movement amount corresponding to the changed F-number, from the table. Furthermore, it is also possible to enable the value of the coefficient k to be changed by an operation by the user. In this case, the focusing position setting unit 13 may calculate the focus movement amount d on the basis of Formula 2, and may prepare a table for each coefficient k.

In the case of an image pickup apparatus having a fixed F-number, the focus should be moved in accordance with a value that has been set previously so as to satisfy Formula 2. Furthermore, in the case of an image pickup apparatus having a fixed F-number, it is possible to enable the value of the coefficient k to be changed by an operation by the user.

<Wavelength Determination>

Here, Formula 2 is a function including the wavelength, and, therefore, it is desirable for the focus movement amount to be decided by the wavelength that is used for depth measurement (in other words, the wavelength of the light used for capturing the first and second images). If a color filter is arranged on the image sensor, then the blur differs with the wavelength and, therefore, it is desirable to carry out depth measurement respectively for each color. In this case, the focus movement amount should be set by using the central wavelength of the color filter. Also, it is necessary to capture images by moving the focus in accordance with the number of colors of the color filter. In order to simplify this, in the case of an RGB pixel arrangement, for example, a large number of green (G) pixels are arranged and, therefore, it is desirable to carry out depth measurement using the G pixels. In this case, the central wavelength of the G pixel filter is used to set the focus movement amount.

Furthermore, in the case of an image sensor having no color filter, light of wavelengths in the whole visible light range is input, and, therefore, the wavelength that is the design reference of the imaging optical system should be used. This is because, in general, the aberration is corrected satisfactorily at the design wavelength. In the present embodiment, the d line (587.56 nm), which is used generally as the design reference of the imaging optical system, is employed.

<Focus Movement Direction>

The focus movement amount has been described as above, and now the focus movement direction will be described with reference to FIGS. 8A and 8B.

Figure 8A:
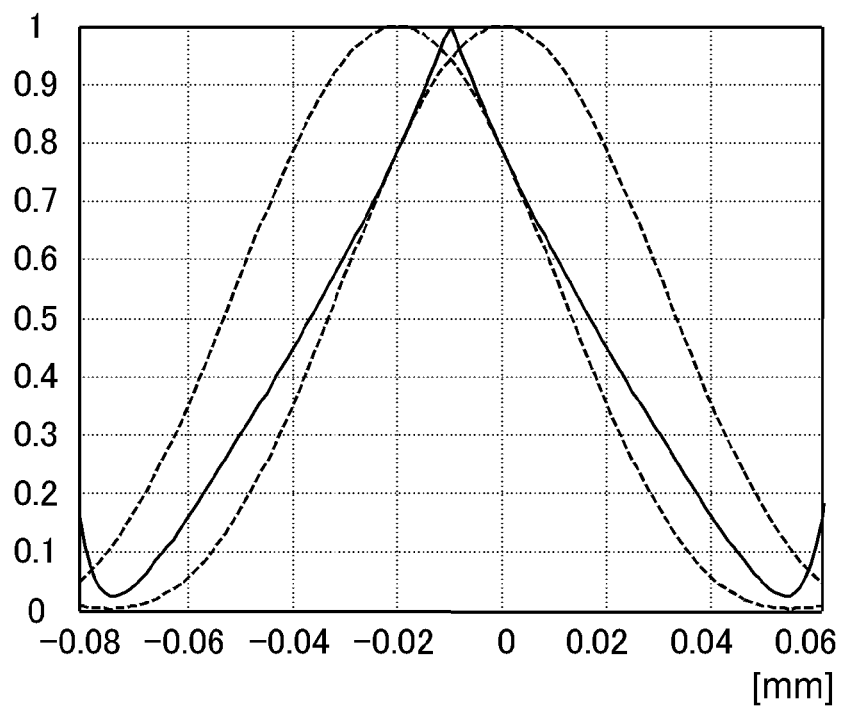
FIGS. 8A and 8B are diagrams showing the dependence on the focus movement amount of the depth measurement range.
Figure 8B:
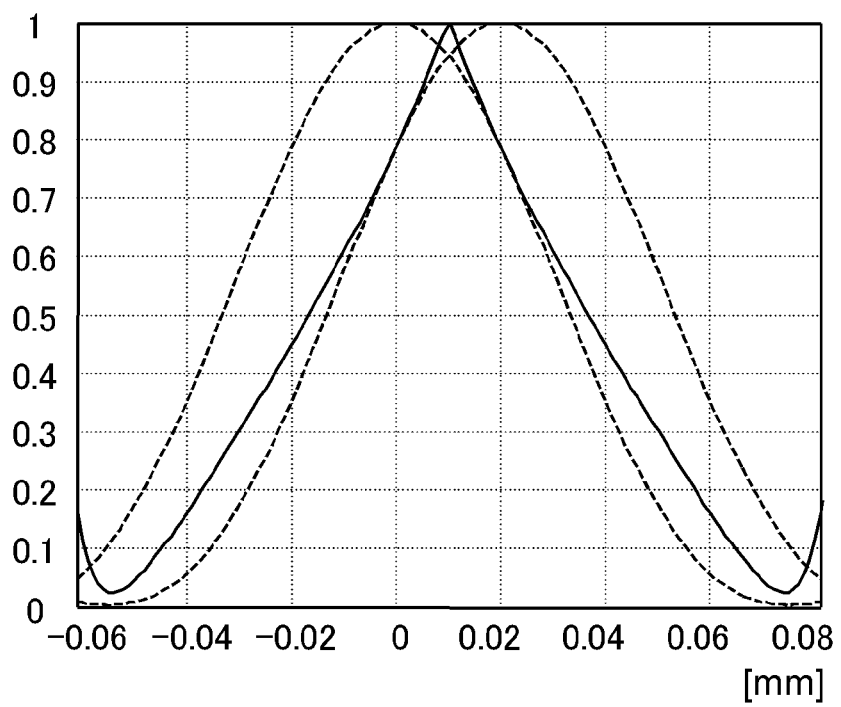

If the zero position in FIG. 8A is taken to be the focusing position at the image plane of the first image, the defocussing characteristics of the PSF of the first image have the shape of a Gaussian function, as indicated by the dotted line that has a peak at the zero position (the shape up to the primary minimum value).

Here, if the depth measurement range is to be broadened toward infinity from the focusing position of the first image, then the focusing position of the second image is moved toward the side of infinity. In this case, the focusing position is moved in the negative direction at the image plane (the other dotted line in FIG. 8A). Consequently, the peak of the PSF peak ratio is moved in the negative direction, as indicated by the solid line in FIG. 8A. Here, it can be seen that the depth measurement range becomes broader in the negative direction.

On the other hand, if the depth measurement range is to be broadened toward the image pickup apparatus from the focusing position of the first image, then the focusing position of the second image is moved toward the side of the image pickup apparatus. As shown in FIG. 8B, the depth measurement range also becomes broader in the positive direction, by moving the focusing position of the second image in the positive direction at the image plane.

In the present embodiment, by moving the focusing position of the second image in the negative direction from the focusing position of the first image, the measurement range from the focusing position toward infinity on the object side is broadened.

<Three-Images Capturing>

The description of the present embodiment has related to the focus movement amount when the depth is measured by using two images, namely, an image at a desired focusing position and an image in which the focusing position has been moved. In the case of these conditions, when determining the PSF peak ratio, the peak of the PSF peak ratio occurs at the central position between the focusing positions of the two images, rather than at the desired focusing position. This result is not suitable for cases when the PSF peak ratio is used directly as relative depth information, without being converted to a depth. If the PSF peak ratio is used directly as the relative depth information, it is desirable to capture one image each respectively at a position displaced to the front side and the rear side of the desired focusing position. The difference between the two focusing positions to the front and rear sides in this case is taken as the focus movement amount according to the present embodiment, and the peak of the PSF peak ratio obtained from the two images is moved so as to achieve the desired focusing position. By this means, it is possible to use the calculated PSF peak ratio directly as relative depth information.

From the foregoing, by capturing a total of three images at the desired focusing position, and at focusing positions to the front and rear sides thereof, it is possible directly to determine a relative depth change at the desired focusing position.

It is also possible to capture an image of a desired-focus after capturing images for depth measurement, but since the previously measured depth range is already known and the desired focusing position is located in between the images used for depth measurement, then it is desirable to capture the image of the desired focus continuously while capturing images for depth measurement.

Furthermore, by capturing three or more images at a focus movement amount between the adjacent two images that is specified according to the present embodiment, and repeating depth measurement for each set of two images, it is also possible to carry out depth measurement through a broader range.

In the case of the image pickup apparatus according to the present embodiment, in acquiring depth information based on the DFD method that uses the defocusing characteristics of the PSF peak, the focus movement amount during imaging is determined in accordance with the F-number and a plurality of images can be captured. Consequently, it is always possible to capture a plurality of images having different focusing positions that are optimal for depth measurement.

Second Embodiment

The image pickup apparatus relating to a second embodiment has a similar composition to the image pickup apparatus relating to the first embodiment. Although the composition is similar, the policy for setting the focus movement amount (and, more specifically, the set value of the coefficient k) is different.

The present embodiment describes conditions of the focusing position that are suited to judging whether or not an object is situated within a particular depth range (two-layer separation). When performing two-layer separation, it is beneficial if the depth measurement range is narrow. Table 3 shows imaging conditions according to the present embodiment.

TABLE 3

| Imaging conditions | |
|---|---|
| Focal length of imaging optical system | 18.0 (mm) |
| F-number | 2.80 |
| Object distance | 3000 (mm) |
| Focus movement amount at image plane | −0.0660 (mm) |
| Depth measurement wavelength | 587.56e−6 (mm) |

In the imaging conditions according to the present embodiment, in order to narrow the depth measurement range, the F-number is made small and the focus movement amount (absolute value) is made large.

As shown in FIG. 6A, in order to narrow the depth measurement range, the focus movement amount should be made large. However, if the focus movement amount is made too large, then a problem arises in that the reliability of the PSF peak ratio declines. Therefore, the maximum value of the focus movement amount is restricted as follows.

Figure 16:
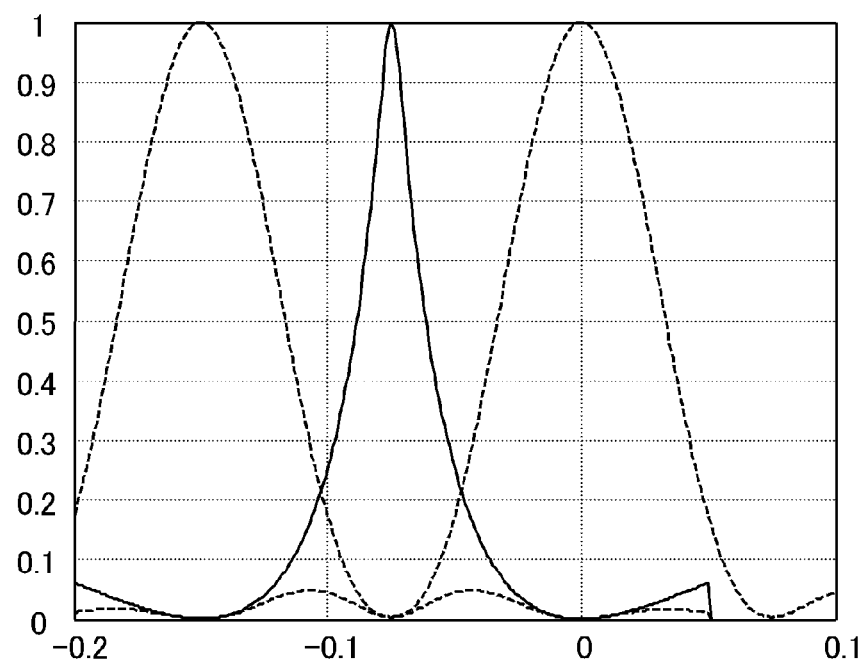
FIG. 16 is a diagram showing the characteristics of a PSF peak ratio when the focus movement amount is a maximum.

As shown in FIG. 4, the PSF peak value is a maximum at the focusing position, and declines as defocusing occurs, assuming a primary minimum value when the amount of defocus from the focusing position is a prescribed amount (±75 μm in the example in FIG. 4). FIG. 16 shows a case when the positions of the primary minimum values of two PSF peak values are overlapping. In the case of FIG. 16, although the PSF peak ratio can be calculated, this ratio is in a region where both PSF peak values have fallen, and is liable to be affected by noise, etc., and, therefore, it is not possible to determine an effective PSF peak ratio. Furthermore, if the focus movement amount is made larger than this, then similarly, it is not possible to calculate an effective PSF peak ratio. Therefore, the position where the primary minimum values of the two PSF peak values overlap with each other should be set as the maximum value of the focus movement amount. The focus movement amount in this case is calculated to be 150 μm, in the case of an ideal optical system having an F-number of 4. When the value of the coefficient k in Formula 2 is calculated, the result is k≅16.

From the foregoing, a focus movement amount suited to a narrow depth measurement range can be obtained by setting the coefficient k to ±16 or a value close to this, in Formula 2. In practical terms, the focus movement amount should be set using a coefficient k in the range of −16≤k<−8, 8<k≤16.

Figure 9:
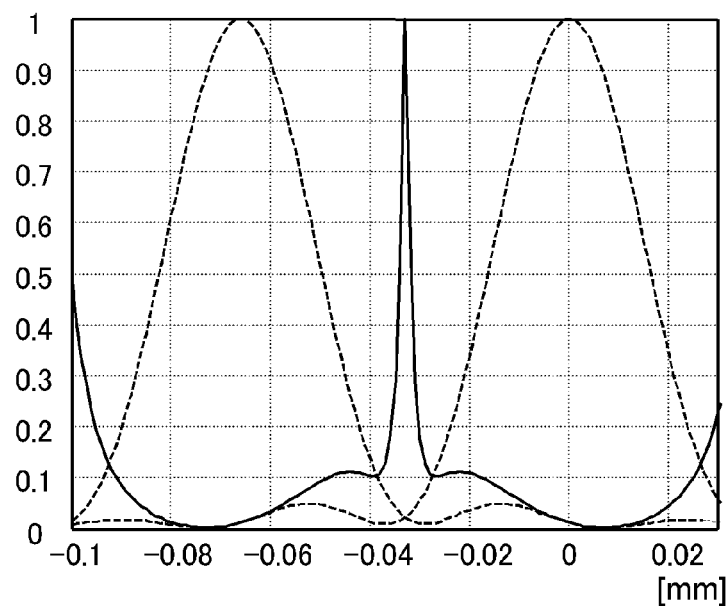
FIG. 9 is a diagram showing the characteristics of a PSF peak ratio relating to a second embodiment of the invention.

The imaging conditions according to the present embodiment are imaging conditions that are set so as to satisfy these conditions. More specifically, the focus movement amount is set using a value of k=14.3. FIG. 9 shows the PSF peak ratio (solid line) under the imaging conditions of the present embodiment, and the defocusing characteristics of the PSF peak value (dotted line) at the two focusing positions.

In the case of these conditions, since the depth measurement range is a narrow 12 μm and the value range of the PSF peak ratio is approximately 90% of the maximum, then it is possible to measure a narrow depth range with high accuracy. However, in the depth measurement range of the PSF peak ratio, the ratio is in a region where the PSF peak values of the two focusing positions are low and, therefore, the value of the PSF peak ratio is liable to be affected by noise, etc., and varies greatly with a slight change. Consequently, the reliability of the calculated PSF peak ratio is low, and even if the value range is broad, accurate depth resolution cannot be achieved.

On the other hand, in the region outside of the depth measurement range, since one of the two PSF peak values is sufficiently large, then the PSF peak ratio is kept to an extremely low value. Consequently, it is possible to extract only the depth measurement range, by separating cases when the PSF peak value is equal to or greater than a certain threshold value, from other cases. In other words, this is suitable for carrying out two-layer depth separation that extracts the depth measurement range only, or three-layer depth separation that distinguishes between the front and rear sides. The threshold value may be set to a value no less than the PSF peak ratio in the maximum depth measurement range, and desirably, is set to approximately 20% of the value range of the PSF peak ratio.

The depth measurement according to the present embodiment is a depth measurement in an intermediate region between two focusing positions, and this depth measurement range does not overlap with the focusing position of the images that are captured. Therefore, if an image that is sharply focused in the extracted depth range is required, then an image of the desired focus may also be captured separately. Moreover, it is also possible to capture two images for depth measurement and an image of the desired focus, continuously, in line with the change in the focusing position.

As stated previously, in the image pickup apparatus according to the present embodiment, it is possible to capture an image that is suited to separating a particular depth range from other ranges.

Third Embodiment

The image pickup apparatus relating to a third embodiment has a similar composition to the image pickup apparatus relating to the first embodiment. Although the composition is the same, the policy for setting the focus movement amount is different.

In the present embodiment, a focus movement amount that is suited to measuring a broader depth range is described. Table 4 shows imaging conditions according to the present embodiment.

TABLE 4

| Imaging conditions | |
|---|---|
| Focal length of imaging optical system | 18.0 (mm) |
| F-number | 8.0 |
| Object distance | 3000 (mm) |
| Focus movement amount at image plane | −0.010 (mm) |
| Depth measurement wavelength | 587.56e−6 (mm) |

The characteristic features of the imaging conditions of the present embodiment are that, in order to carry out broader depth measurement, the F-number is made larger and the focus movement amount is made smaller.

If it is wished to broaden the depth measurement range, then, as shown in FIG. 6A, the focus movement amount should be made as small as possible. However, if the focus movement amount is small, as shown in FIG. 6B, then the value range is also small, and the depth resolution declines. Furthermore, since the value range is narrow, then the value is relatively liable to be affected by noise and the depth measurement accuracy declines. Consequently, if a broader depth measurement range is adopted, the focus movement amount should be set to a position at which the value range becomes no less than approximately 70% of the maximum. More desirably, the value range should be no less than 90%.

The focus movement amount in the present embodiment is set to a range where the value range becomes 90%. In the case of the imaging conditions according to the present embodiment, if the value of k in Formula 2 is calculated, then k=0.266, and this satisfies the range of the coefficient k that is specified by Formula 2. This is a focus movement amount that is suited to a depth measurement in a broad range and, in particular, when the coefficient k is a value close to zero.

As stated previously, in the image pickup apparatus according to the present embodiment, it is possible to capture an image that is suited to measuring the depth in a broad range.

Fourth Embodiment

The image pickup apparatus, relating to a fourth embodiment, has a similar composition to the image pickup apparatus relating to the first embodiment. Although the composition is the same, the policy for setting the focus movement amount is different.

In the present embodiment, imaging conditions for raising the depth resolution at a desired focusing position are described. Similarly to the first embodiment, the number of captured images is two, namely, a first image that is captured at a desired focusing position and a second image that is captured at a displaced focusing position.

Figure 10:
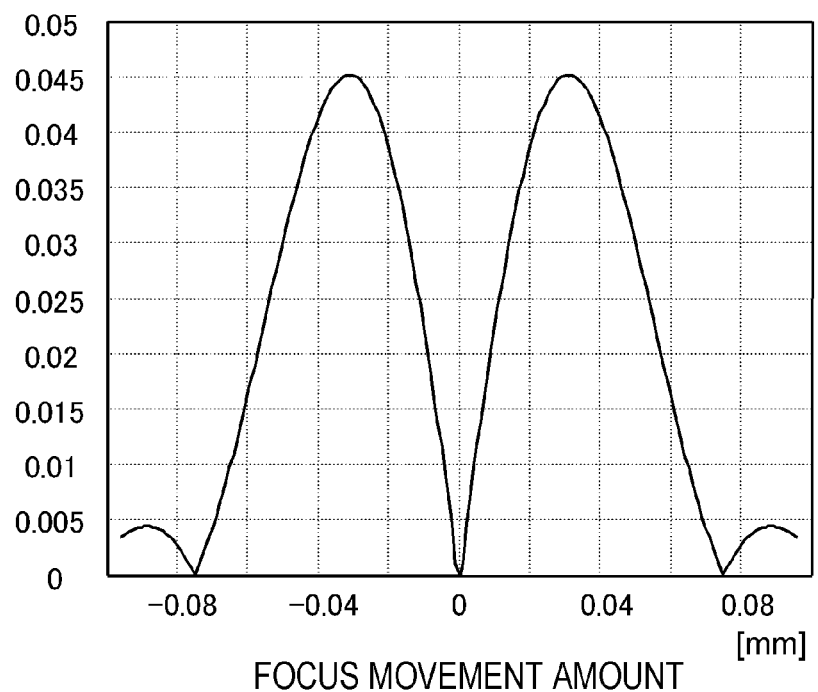
FIG. 10 is a diagram showing the dependence on the focus movement amount of a PSF peak ratio gradient.

The depth resolution becomes higher, the greater the gradient of the PSF peak ratio. This is because the amount of change in the PSF peak ratio with respect to the depth difference becomes larger. Consequently, in order to maximize the depth resolution at the desired focusing position, the focus movement amount should be set so as to achieve a maximum gradient of the PSF peak ratio at that focusing position. FIG. 10 is a diagram that plots the gradient of the PSF peak ratio at the desired focusing position when the wavelength is 587.56 nm and the F-number is four. The horizontal axis in FIG. 10 is the focus movement amount. The gradient of the PSF peak ratio becomes a maximum when the focus movement amount is ±0.031 mm.

In this case, when the value of the coefficient k in Formula 2 is calculated, the result is k=3.30. In practical terms, if the coefficient k is set to a range of $-4 < k \leq -2$ and $2 \leq k < 4$, then a sufficient depth resolution is obtained at the focusing position. As described above, in the image pickup apparatus according to the present embodiment, it is possible to capture images for depth measurement in such a manner that the depth resolution at the desired focusing position becomes a maximum.

Fifth Embodiment

The image pickup apparatus relating to a fifth embodiment has a similar composition to the image pickup apparatus relating to the first embodiment. Although the composition is the same, the policy for setting the focus movement amount is different. In the present embodiment, the focus movement amount is set in such a manner that the desired focusing position (the focusing position of the first image) is included in the depth measurement range.

As shown in FIGS. 5A to 5F, the depth measurement range becomes narrower, the greater the focus movement amount. In FIGS. 5A to 5D, the focusing position of the first image (the 0 μm position on the horizontal axis) is included in the depth measurement range, but as the focus movement amount becomes larger, as in FIGS. 5E and 5F, then the focusing position of the first image moves out of the depth measurement range.

Here, if the amount of defocus when the PSF peak value has the primary minimum value is called the minimum defocus amount, then the focusing position of the first image is included in the depth measurement range in cases when the focus movement amount (absolute value) is less than the minimum defocus amount. In other words, in order that the focusing position of the first image is included in the depth measurement range, the value for the coefficient k is chosen so that the focus movement amount d obtained by Formula 2 is less than the minimum defocus amount.

Since the minimum defocus amount is approximately 0.075 mm when F=4 and λ=587.56 nm, then the focus movement amount d should be set to a range of −0.075 mm to +0.075 mm (excluding 0 mm). The range of the coefficient k in this case is −8≤k≤8 (k≠0).

If the focus movement amount is equal to the minimum defocus amount, then the depth measurement range is only one side, either the front side or the rear side, of the focusing position of the first image. This direction matches the direction in which the focus is moved when capturing the second image.

Sixth Embodiment

The image pickup apparatus relating to a sixth embodiment has a similar composition to the image pickup apparatus relating to the first embodiment. Although the composition is similar, the indicator used for depth measurement is different. Table 5 shows imaging conditions used in the present embodiment.

TABLE 5

| Imaging conditions | |
| --- | --- |
| Focal length of imaging optical system | 18.0 (mm) |
| F-number | 4.00 |
| Object distance | 3000 (mm) |
| Focus movement amount at image plane | −0.0550 (mm) |
| Depth measurement wavelength | 587.56e−6 (mm) |

In the present embodiment, a method of setting a focus movement amount in a case when depth measurement is carried out using the PSF correlation amount, rather than the PSF peak value, will be described.

The depth measurement using the PSF correlation amount uses, as an indicator, the extent of similarity between the shapes of the PSF of two images.

As a depth measurement method using the PSF correlation amount, it is possible to employ a normalized cross-correlation, for example. The normalized cross-correlation NCC can be calculated by Formula 8 below, using the same partial regions of the two captured images for Cf1 and Cf2:

[Math. 8]

$$NCC = \frac{\sum (Cf1 - \overline{Cf1})(Cf2 - \overline{Cf2})}{\sqrt{\sum (Cf1 - \overline{Cf1})^2 \sum (Cf2 - \overline{Cf2})^2}}. \quad \text{(Formula 8)}$$

Figure 11:
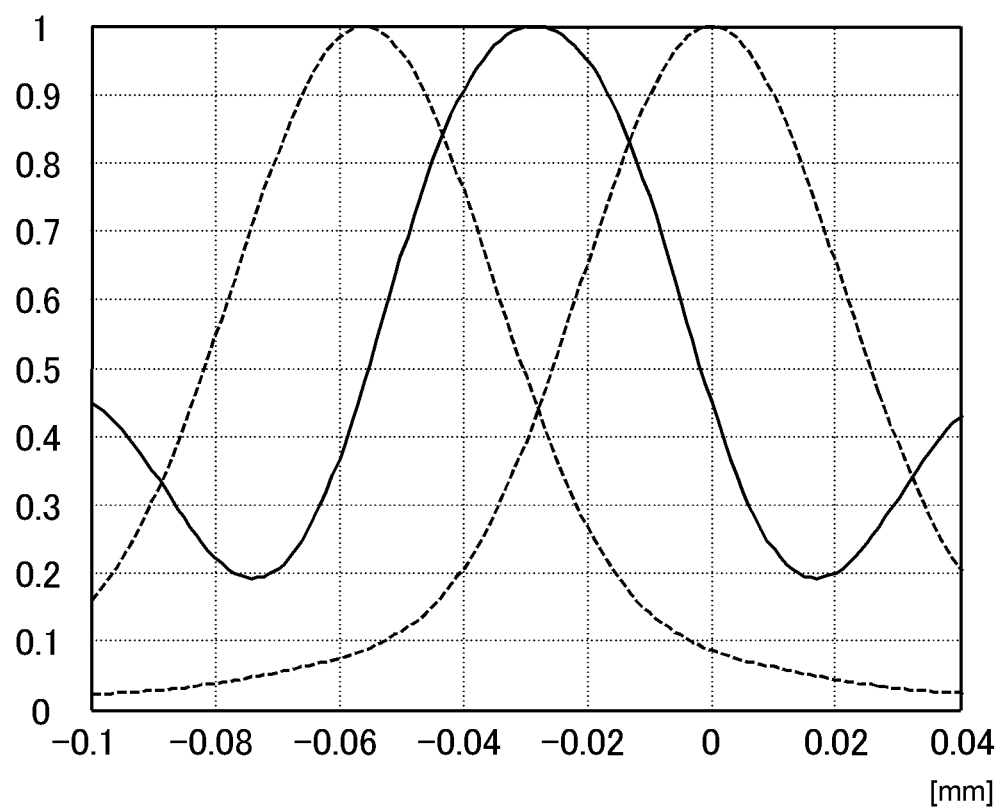
FIG. 11 is a diagram showing defocusing characteristics of a PSF correlation amount.
Figure 12A:
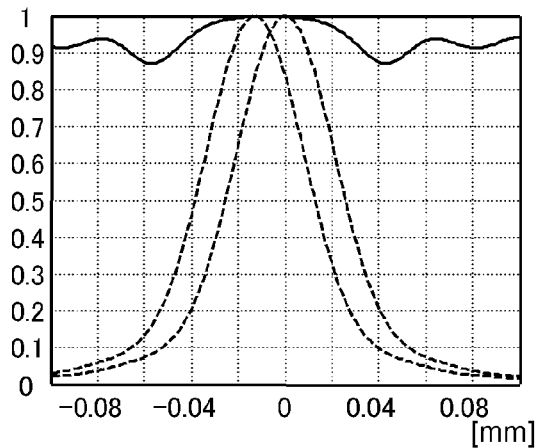
FIGS. 12A to 12F are diagrams showing the characteristics of a PSF correlation amount relating to a sixth embodiment.
Figure 12B:
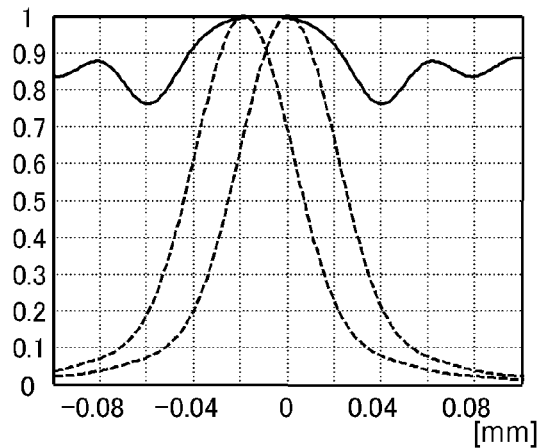
Figure 12C:
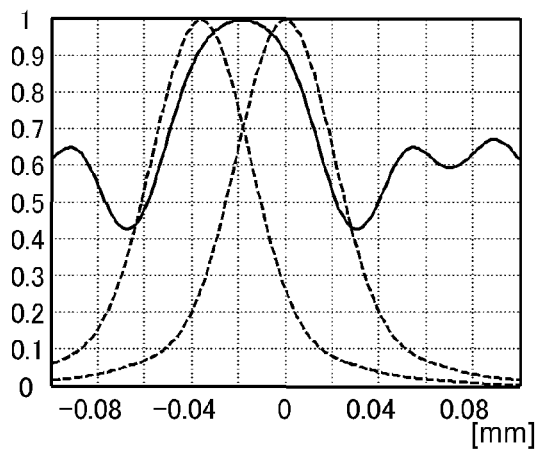
Figure 12D:
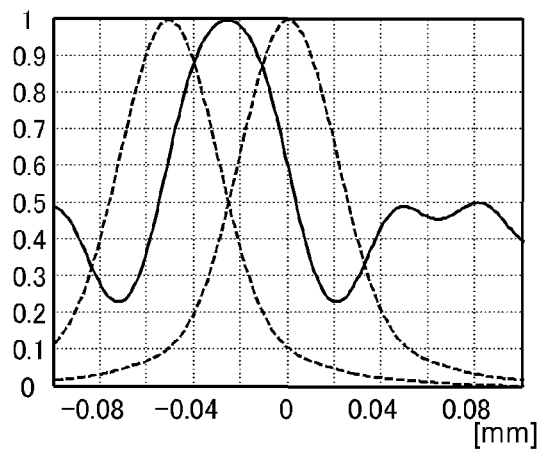
Figure 12E:
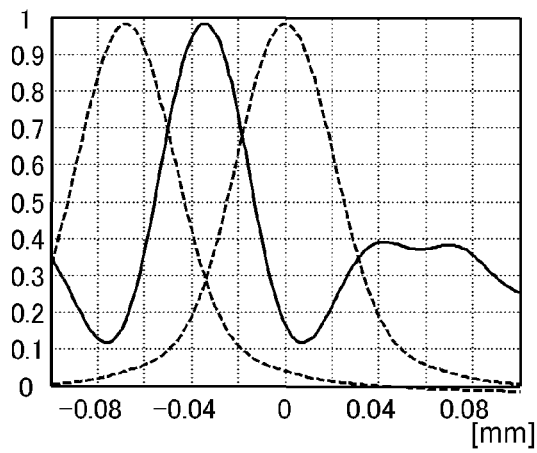
Figure 12F:
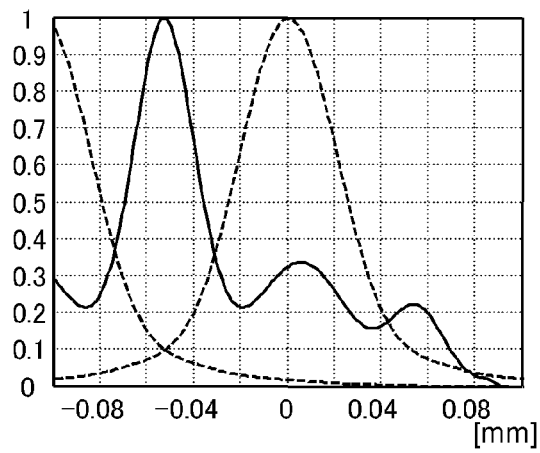

FIG. 11 shows the defocusing characteristics of the PSF correlation amount obtained by Formula 8, using the imaging conditions according to the present embodiment. The curve shown by the solid line in FIG. 11 is a curve that plots the defocusing characteristics of the normalized cross-correlation of two PSFs at the image plane having different focusing positions captured under the imaging conditions according to the present embodiment. The two curves indicated by the dotted lines are the normalized defocusing characteristics of the variance of two PSFs for different focusing positions.

Thereupon, the depth measurement range in the depth measurement using the PSF correlation amount will be described with reference to FIG. 11.

As indicated by the solid line in FIG. 11, the value of the defocusing characteristics of the PSF correlation amount falls gradually from the central position between the two different focusing positions, reaches a minimum value, and then rises again, subsequently repeating this pattern. In the case of the defocusing characteristics curve of the PSF correlation amount also, the maximum peak is called the "maximum peak" or the "primary peak", and the local minimum values, which respectively appear initially on the front side and the rear side of the maximum peak, are called the "primary minimum values".

<Focus Movement Amount and PSF Correlation Amount Characteristics>

Next, the relationship between the focus movement amount and the change in the depth measurement range, and the relationship between the focus movement amount and the change in the value range of the PSF correlation amount, will be described, and the setting of a more suitable focus movement amount will be explained.

FIGS. 12A to 12F show the defocusing characteristics of the PSF variance and the change in the PSF correlation amount (normalized cross-correlation value), when the focus movement amount is changed. The focus movement amount is expressed as a difference in the horizontal axis direction between the defocussing characteristics of two PSF variance values (dotted line). In other words, the focus movement amount gradually becomes larger, from FIG. 12A toward FIG. 12F. Here, examples are shown in which the value at the point of intersection of the defocussing characteristics of the two PSF variance values (the point of intersection of the dotted lines) is set respectively to 95%, 90%, 70%, 50%, 30%, and 10% of the maximum value of the PSF variance. It can be seen that, as the focus movement amount increases, the characteristics of the PSF correlation amount (solid line) change. More specifically, it can be seen that the depth measurement range (the range between the primary minimum value position on the front side and the primary minimum value position on the rear side of the maximum peak of the PSF correlation amount) becomes gradually narrower as the focus movement amount becomes larger.

Similarly, it can be seen that the value range of the PSF correlation amount (the difference between the maximum value and the primary minimum value of the PSF correlation amount) broadens and then narrows, as the focus movement amount becomes larger. The depth resolution becomes higher, the broader the range of the value of the PSF correlation amount, and hence, the tolerance with respect to variable factors, such as noise, becomes higher, and the depth measurement accuracy is improved.

Figure 13A:
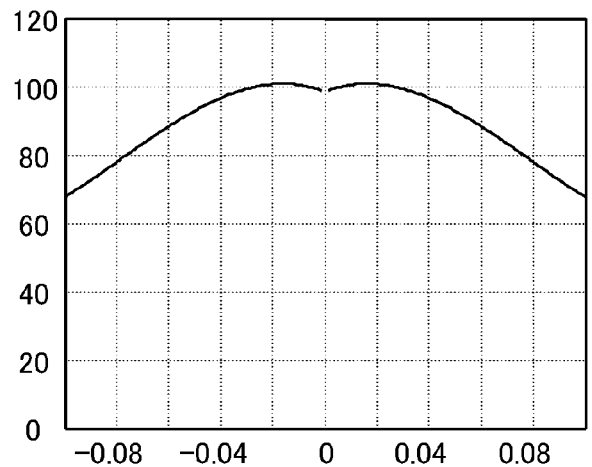
FIGS. 13A to 13C are diagrams showing the dependence on the focus movement amount, of the depth measurement range and the PSF correlation amount.
Figure 13B:
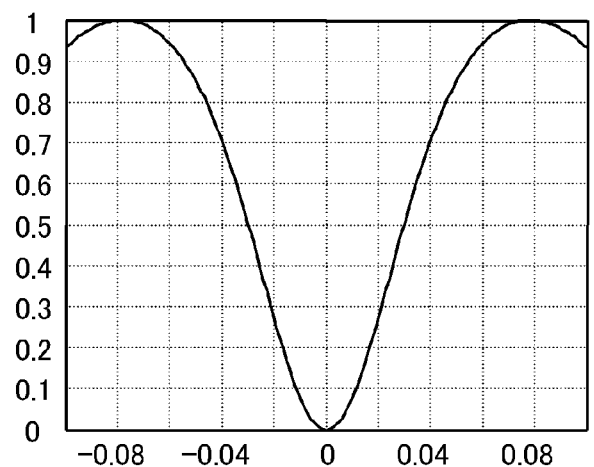

FIGS. 13A and 13B respectively show a change in the depth measurement range in accordance with the focus movement amount, and a change in the range of the value of the PSF correlation amount. In FIG. 13A, the horizontal axis represents the focus movement amount and the vertical axis represents the depth measurement range on the side of the image plane. There is a singular point when the focus movement amount is zero, since depth measurement is not possible, in this case.

Similarly, in FIG. 13B, the horizontal axis represents the focus movement amount and the vertical axis represents the value range. Here, the PSF correlation amount is normalized and, therefore, the maximum value of the value range is one. The value range is a maximum when the focus movement amount is in the vicinity of ±0.078 mm.

Figure 13C:
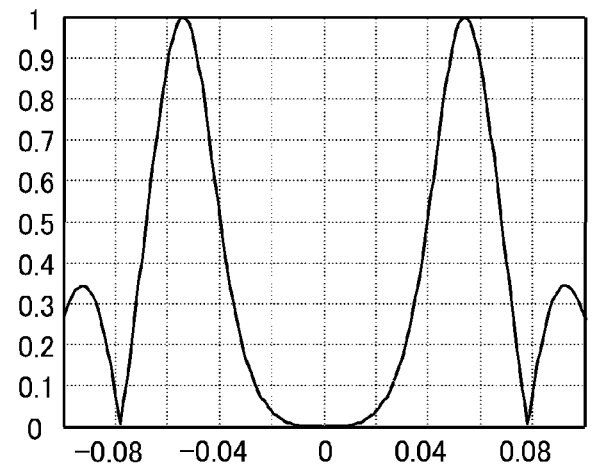

Furthermore, FIG. 13C shows a change in the gradient of the PSF correlation amount at the focusing position of the first image, with the focus movement amount. The value range is a maximum when the focus movement amount is in the vicinity of ±0.054 mm.

The greater the focus movement amount, the lower the variance of the PSF in the region where the PSF correlation amount is determined. In this region, the PSF becomes very broad and the PSF correlation amount is liable to be affected by noise. Therefore, the maximum value of the focus movement amount is limited by a certain extent. The maximum value of the focus movement amount should be set up to a distance at which the value at the point of intersection between the two PSF variances falls to $1/e^2$ from the maximum value of the PSF variance. The point of intersection between the two PSF variances is at the midpoint between the two focusing positions (in other words, at half of the focus movement amount), and, therefore, the conditions described above can also be expressed as making the focus movement amount (absolute value) less than two times the amount of defocus at which the PSF variance becomes $1/e^2$ of the maximum value. This is based on the same approach as the definition of the beam waist diameter of a laser. To satisfy this condition, the value of the coefficient k in Formula 2 should be set to around ten or less.

<Policy with Regard to Optimal Focus Movement Amount>

Figure 14:
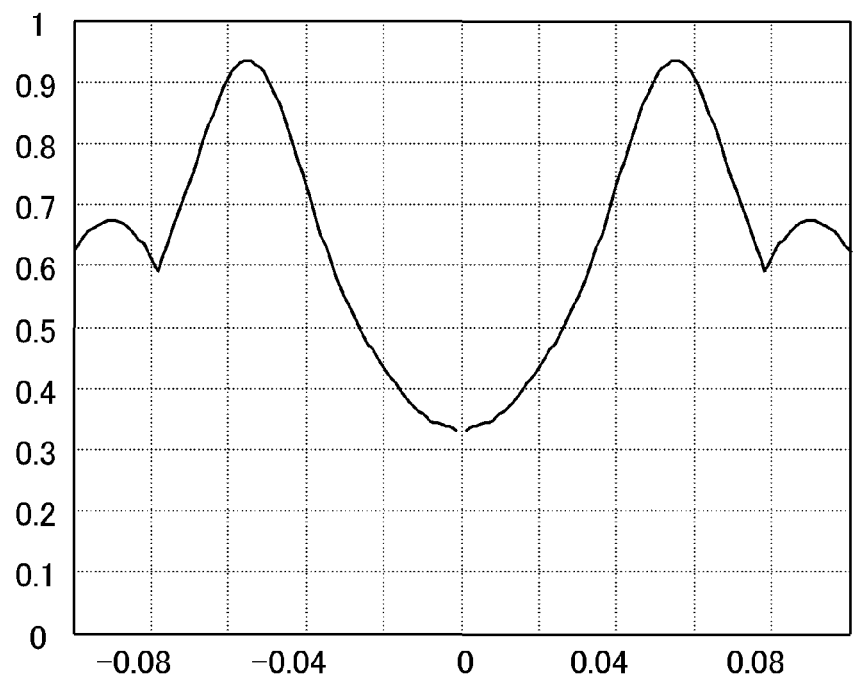
FIG. 14 is a diagram showing a change in an evaluation value with the focus movement amount.

In the present embodiment, the imaging conditions are set in such a manner that the breadth of the depth measurement range, the breadth of the value range, and the height of the depth resolution at the focusing position of the first image are all satisfied simultaneously. More specifically, an evaluation value (score) is calculated by respectively normalizing the three factors: the depth measurement range, the value range, and the gradient of the PSF correlation amount at the focusing position, and weighted-averaging the factors. The focus movement amount that achieves the largest evaluation value is set. In the present embodiment, an evaluation is made by using the same weight for each factor. Here, the optimal focus movement amount is ±0.055 mm. The results of this are shown in FIG. 14.

In the imaging conditions according to the present embodiment, the focus movement amount d=−0.055 mm, the F-number is F=4, and the wavelength λ=587.56 nm. If the value of the coefficient k in Formula 2 is calculated from these values, then k=5.85, and the range of the coefficient k stipulated in Formula 2 is satisfied.

In the present embodiment, a normalized cross-correlation is used as an example of a depth measurement based on the PSF correlation amount, but it is also possible to calculate a PSF correlation amount by another method. Furthermore, the focus movement amount should be set using at least one of the measurement range, the value range, and the gradient of the correlation value at the focusing position.

<Installation Example>

The depth measurement technology according to the present invention described above is desirably applied in an image pickup apparatus, such as a digital camera or a camcorder, or an image processing apparatus or a computer that carries out image processing of image data obtained by an image pickup apparatus. Furthermore, the technology of the present invention can also be applied to electronic equipment of various types that incorporates an image pickup apparatus or an image processing apparatus of this kind (equipment such as mobile telephones, smartphones, tablet terminals, and personal computers).

In the embodiment described above, a composition that incorporates the functions of the depth information determination unit into the main body of the image pickup apparatus was described, but the functions of the depth information determination unit may be composed in any way. For example, it is possible to incorporate a depth information determination unit into a computer having an image pickup apparatus, in such a manner that a computer acquires images captured by the image pickup apparatus and carries out a depth calculation on the basis of the images. Furthermore, the depth information determination unit may be incorporated into a computer that has network access by a wired or a wireless connection, a plurality of images may be acquired by the computer via the network, and a depth calculation may be carried out on the basis of these images. The depth information thus obtained can be used for various image processing, such as dividing up image regions, generating three-dimensional images and depth images, emulating blur effects, and so on.

Actual installation in the apparatuses described above can be a software (program)-based installation or a hardware-based installation. For example, various processes for achieving the object of the present invention can also be implemented by storing a program in the memory of a computer (such as a microcomputer, or an FPGA) that is incorporated into an image pickup apparatus or an image processing apparatus. Furthermore, desirably, a special processor, such as an ASIC, is provided to achieve all of or a portion of the processes according to the present invention by a logic circuit.

Aspects of the present invention can also be realized by a computer of a system or an apparatus (or devices such as a CPU or an MPU) that reads out and executes a program recorded on a memory device to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (e.g., a non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus comprising:
an imaging unit acquiring a first image by capturing an object at a first focusing position, and acquiring a second image after acquiring the first image, by capturing the object at a second focusing position that is different from the first focusing position, the second image having different blur than that of the first image;
a depth information determination unit determining depth information of the object on a basis of a difference in blur between the first image and the second image; and
a focusing position setting unit setting a focus movement amount that is a difference between the first focusing position and the second focusing position, in accordance with an F-number of the imaging unit,
wherein, in a case that the F-number of the image unit is changed automatically or by a user operation to a changed F-number, the focusing position setting unit sets the second focusing position in accordance with the changed F-number in such a manner that an absolute value of the focus movement amount is greater when the F-number is large, as compared to when the F-number is relatively small, and
the focusing position setting unit sets the second focusing position in such a manner that the focus movement amount satisfies the formula given below:

$$d=kF^2\lambda,\ -16\le k\le 16,\ k\ne 0,$$

where d is the focus movement amount at an image plane, k is a coefficient, F is the F-number, and $\lambda$ is a wavelength of light used to capture the first image and the second image.

2. The image pickup apparatus according to claim 1, wherein the depth information determination unit determines the depth information on a basis of a ratio between a peak value of a point speed function (PSF) of the imaging unit obtained from the first image and a peak value of a PSF obtained from the second image.

3. The image pickup apparatus according to claim 2, wherein the peak value of the PSF of the imaging unit is a maximum at a focusing position and decreases as defocusing occurs, reaching a local minimum value when an amount of defocus from the focusing position is a prescribed amount, and
an absolute value of the focus movement amount is set to a value less than the prescribed amount.

4. The image pickup apparatus according to claim 1, wherein the depth information determination unit determines the depth information on a basis of a correlation between a point speed function (PSF) of the imaging unit obtained from the first image and a PSF of the imaging unit obtained from the second image.

5. The image pickup apparatus according to claim 4, wherein a variance value of the PSF of the imaging unit is a maximum at a focusing position and decreases as defocusing occurs, reaching a value $1/e^2$ of the maximum value when an amount of defocus from the focusing position is a prescribed amount, and
an absolute value of the focus movement amount is set to a value that is less than two times the prescribed amount.

6. The image pickup apparatus according to claim 1, wherein, if the depth information determination unit is a unit that determines whether or not the object is included in one particular depth range, the focus movement amount is set so as to satisfy the formula given below:

$$d=kF^2\lambda,\ -16\le k<-8,\ 8<k\le 16.$$

7. The image pickup apparatus according to claim 1, wherein, if the depth information determination unit is a unit that determines in which of three or more depth ranges the object is included, the focus movement amount is set so as to satisfy the formula given below:

$$d=kF^2\lambda,\ -8\le k<0,\ 0<k\le 8.$$

8. The image pickup apparatus according to claim 7, wherein the focus movement amount is set so as to satisfy the formula given below:

$$d=kF^2\lambda,\ -4<k\le -2,\ 2\le k<4.$$

9. The image pickup apparatus according to claim 1, wherein, if the depth information determination unit determines depth information of an object that is situated to the side of infinity from the first focusing position, then the second focusing position is set to the side of infinity from the first focusing position.

10. The image pickup apparatus according to claim 1, wherein, if the depth information determination unit determines depth information of an object that is situated to the side of the image pickup apparatus from the first focusing position, then the second focusing position is set to the side of the image pickup apparatus from the first focusing position.

11. The image pickup apparatus according to claim 1, wherein the imaging unit has an image sensor equipped with a color filter having an arrangement of RGB pixels, and λ is a central wavelength of a color filter of a green pixel.

12. The image pickup apparatus according to claim 1, wherein λ is 587.56 nm.

13. The image pickup apparatus according to claim 1, wherein the focusing position setting unit has a memory storing a correspondence table of F-numbers and focus movement amounts, and reads out the focus movement amount from the correspondence table in accordance with the changed F-number.

14. The image pickup apparatus according to claim 1, wherein the second focusing position is automatically changed in accordance with the changed F-number in such a manner that an absolute value of the focus movement amount is proportional to a square of the F-number.

15. The image pickup apparatus according to claim 1, wherein the depth information determination unit determines the depth information on a basis of a correlation between a partial region of the first image and a corresponding partial region of the second image.

16. A depth information acquisition method comprising:
a focusing position setting step of setting a focus movement amount that is a difference between a first focusing position and a second focusing position, in accordance with an F-number in an imaging unit, the second focusing position being different from the first focusing position;
a first imaging step of acquiring a first image by capturing an object at a first focusing position;
a second imaging step of acquiring a second image having different blur from that of the first image, by capturing the object at the second focusing position, after the first imaging step; and
a depth information determining step of determining depth information of the object on a basis of a difference in blur between the first image and the second image,
wherein, in a case that the F-number of the imaging unit is changed automatically or by a user operation to a changed F-number, the second focusing position is automatically changed in accordance with the changed F-number in such a manner that an absolute value of the focus movement amount is greater when the F-number is large, as compared to when the F-number is relatively small, and
the second focusing position is set in such a manner that the focus movement amount satisfies the formula given below:

$$d=kF^2\lambda,\ -16\leq k\leq 16,\ k\neq 0,$$

where d is the focus movement amount at an image plane, k is a coefficient, F is the F-number, and λ is a wavelength of light used to capture the first image and the second image.

17. A non-transitory computer readable storage medium storing a program that causes a computer to execute an acquisition method comprising:
a focusing position setting step of setting a focus movement amount that is a difference between a first focusing position and a second focusing position, in accordance with an F-number of an imaging unit, the second focusing position being different from the first focusing position;
a first imaging step of acquiring a first image by capturing an object at the first focusing position by using the imaging unit;
a second imaging step of acquiring a second image having different blur from that of the first image, by capturing the object at the second focusing position by using the imaging unit, after the first imaging step; and
a depth information determining step of determining depth information of the object on a basis of a difference in blur between the first image and the second image,
wherein, in a case that the F-number of the imaging unit is changed automatically or by a user operation to a changed F-number, the second focusing position is automatically changed in accordance with the changed F-number in such a manner that an absolute value of the focus movement amount is greater when the F-number is large, as compared to when the F-number is relatively small, and
the second focusing position is set in such a manner that the focus movement amount satisfies the formula given below:

$$d=kF^2\lambda,\ -16\leq k\leq 16,\ k\neq 0,$$

where d is the focus movement amount at an image plane, k is a coefficient, F is the F-number, and λ is a wavelength of light used to capture the first image and the second image.

18. An image pickup apparatus comprising:
at least one processor that operates:
to acquire a first image by capturing an object at a first focusing position, and to acquire a second image after acquiring the first image, by capturing the object at a second focusing position that is different from the first focusing position, by using an imaging unit, the second image having different blur than the first image;
to determine depth information of the object on a basis of a difference in blur between the first image and the second image; and
to set a focus movement amount that is different between the first focusing position and the second focusing position, in accordance with an F-number of the imaging unit,
wherein, in a case that the F-number of the imaging unit is changed automatically or by a user operation to a changed F-number, the second focusing position is automatically changed in accordance with the changed F-number in such a manner that an absolute value of the focus movement is greater when the F-number is large, as compared to when the F-number is relatively small, and
the second focusing position is set in such a manner that the focus movement amount satisfies the formula given below:

$$d=kF^2\lambda,\ -16\leq k\leq 16,\ k\neq 0,$$

where d is the focus movement amount at an image plane, k is a coefficient, F is the F-number, and λ is a wavelength of light used to capture the first image and second image.

* * * * *